United States Patent
Greenzeiger et al.

(10) Patent No.: US 9,411,510 B2
(45) Date of Patent: Aug. 9, 2016

(54) TECHNIQUES FOR PREVENTING TYPOGRAPHICAL ERRORS ON SOFT KEYBOARDS

(71) Applicant: Apple Inc., Cupertino, CA (US)

(72) Inventors: Michael Froimowitz Greenzeiger, Sunnyvale, CA (US); Ravindra Marotirao Phulari, San Jose, CA (US); Mehul Kirtikant Sanghavi, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 523 days.

(21) Appl. No.: 13/707,869

(22) Filed: Dec. 7, 2012

(65) Prior Publication Data

US 2014/0164973 A1 Jun. 12, 2014

(51) Int. Cl.
*G06F 3/0488* (2013.01)
*G06F 3/023* (2006.01)
*G06F 17/27* (2006.01)

(52) U.S. Cl.
CPC .......... *G06F 3/04886* (2013.01); *G06F 3/0233* (2013.01); *G06F 17/273* (2013.01)

(58) Field of Classification Search
None
See application file for complete search history.

(56) References Cited

U.S. PATENT DOCUMENTS

| | | | |
|---|---|---|---|
| 5,128,672 A * | 7/1992 | Kaehler | 341/23 |
| 5,748,512 A * | 5/1998 | Vargas | 708/142 |
| 5,963,671 A * | 10/1999 | Comerford et al. | 382/230 |
| 6,323,846 B1 | 11/2001 | Westerman et al. | |
| 6,570,557 B1 | 5/2003 | Westerman et al. | |
| 6,573,844 B1 * | 6/2003 | Venolia et al. | 341/22 |
| 6,677,932 B1 | 1/2004 | Westerman | |
| 7,453,439 B1 * | 11/2008 | Kushler et al. | 345/168 |
| 7,508,324 B2 * | 3/2009 | Suraqui | 341/22 |
| 7,614,008 B2 | 11/2009 | Ording | |
| 7,633,076 B2 | 12/2009 | Huppi et al. | |
| 7,657,849 B2 | 2/2010 | Chaudhri et al. | |
| 7,663,607 B2 | 2/2010 | Hotelling et al. | |
| 7,694,231 B2 | 4/2010 | Kocienda et al. | |
| 7,844,914 B2 | 11/2010 | Andre et al. | |
| 7,957,762 B2 | 6/2011 | Herz et al. | |
| 8,006,002 B2 | 8/2011 | Kalayjian et al. | |
| 8,239,784 B2 | 8/2012 | Hotelling et al. | |
| 8,279,180 B2 | 10/2012 | Hotelling et al. | |
| 8,381,135 B2 | 2/2013 | Hotelling et al. | |
| 8,479,122 B2 | 7/2013 | Hotelling et al. | |
| 8,639,494 B1 * | 1/2014 | Roper | G06F 17/273 702/150 |
| 2001/0019338 A1 * | 9/2001 | Roth | G06F 3/0482 715/811 |
| 2002/0015024 A1 | 2/2002 | Westerman et al. | |
| 2003/0080945 A1 * | 5/2003 | Betts-LaCroix | 345/168 |

(Continued)

OTHER PUBLICATIONS

Baldwin et al., "Towards Online Adaptation and Personalization of Key-Target Resizing for Mobile Devices" dated Feb. 14-17, 2012, 10 pages.

*Primary Examiner* — Ryan Barrett
(74) *Attorney, Agent, or Firm* — Fenwick & West LLP

(57) ABSTRACT

Techniques for preventing typographical errors on digital soft keyboards are implemented by a computing device with a touch-screen display. According to one technique, a plurality of soft keys of a soft keyboard is displayed on the touch-screen display. Each soft key covers an area of the touch-screen display. One or more occurrences of a particular typographical error in which a user erroneously selects an adjacent soft key in addition to or instead of an intended soft key are detected. In response, an activation region of the intended soft key is changed to decrease the probability of the user making the same typographical error in the future.

33 Claims, 19 Drawing Sheets

(56) References Cited

U.S. PATENT DOCUMENTS

| | | | |
|---|---|---|---|
| 2005/0116927 A1* | 6/2005 | Voelckers | 345/157 |
| 2005/0190059 A1 | 9/2005 | Wehrenberg | |
| 2005/0225540 A1* | 10/2005 | Kawakami et al. | 345/173 |
| 2005/0248525 A1* | 11/2005 | Asai | 345/156 |
| 2006/0017692 A1 | 1/2006 | Wehrenberg et al. | |
| 2006/0026536 A1 | 2/2006 | Hotelling et al. | |
| 2006/0033724 A1 | 2/2006 | Chaudhri et al. | |
| 2006/0085757 A1* | 4/2006 | Andre et al. | 715/771 |
| 2006/0161871 A1 | 7/2006 | Hotelling et al. | |
| 2006/0197753 A1 | 9/2006 | Hotelling | |
| 2006/0228149 A1* | 10/2006 | Harley | 400/486 |
| 2006/0232551 A1* | 10/2006 | Matta | 345/156 |
| 2007/0046641 A1* | 3/2007 | Lim | 345/173 |
| 2007/0152978 A1 | 7/2007 | Kocienda et al. | |
| 2007/0152980 A1 | 7/2007 | Kocienda et al. | |
| 2007/0216658 A1* | 9/2007 | Rainisto | 345/173 |
| 2007/0229476 A1* | 10/2007 | Huh | 345/173 |
| 2007/0250786 A1* | 10/2007 | Jeon et al. | 715/765 |
| 2008/0052639 A1* | 2/2008 | Chun | G06F 3/0482 715/810 |
| 2008/0158020 A1* | 7/2008 | Griffin | 341/22 |
| 2008/0165160 A1 | 7/2008 | Kocienda et al. | |
| 2008/0263024 A1* | 10/2008 | Landschaft | G06F 17/3087 |
| 2008/0284744 A1* | 11/2008 | Park et al. | 345/173 |
| 2008/0316212 A1* | 12/2008 | Kushler | 345/467 |
| 2009/0007001 A1* | 1/2009 | Morin et al. | 715/773 |
| 2009/0040184 A9* | 2/2009 | Pu et al. | 345/171 |
| 2009/0097753 A1* | 4/2009 | Millington | 382/187 |
| 2009/0168609 A1* | 7/2009 | Weir | G06Q 10/109 368/21 |
| 2009/0174667 A1* | 7/2009 | Kocienda et al. | 345/169 |
| 2009/0303187 A1* | 12/2009 | Pallakoff | 345/169 |
| 2009/0319935 A1* | 12/2009 | Figura | 715/773 |
| 2010/0020033 A1* | 1/2010 | Nwosu | 345/173 |
| 2010/0066695 A1* | 3/2010 | Miyazaki | 345/173 |
| 2010/0073329 A1* | 3/2010 | Raman et al. | 345/177 |
| 2010/0104134 A1* | 4/2010 | Wang et al. | 382/103 |
| 2010/0194690 A1* | 8/2010 | Wilairat | 345/168 |
| 2010/0235770 A1 | 9/2010 | Ording et al. | |
| 2010/0259561 A1* | 10/2010 | Forutanpour | G06F 3/0216 345/660 |
| 2010/0265181 A1* | 10/2010 | Shore | 345/168 |
| 2010/0313120 A1* | 12/2010 | Ho et al. | 715/261 |
| 2010/0315266 A1* | 12/2010 | Gunawardana | G06F 3/04886 341/22 |
| 2010/0317371 A1* | 12/2010 | Westerinen | H04M 1/72566 455/456.6 |
| 2011/0041056 A1* | 2/2011 | Griffin et al. | 715/708 |
| 2011/0078563 A1* | 3/2011 | Archer | 715/261 |
| 2011/0078597 A1 | 3/2011 | Rapp et al. | |
| 2011/0078613 A1* | 3/2011 | Bangalore | 715/773 |
| 2011/0083104 A1* | 4/2011 | Minton | 715/815 |
| 2011/0157090 A1* | 6/2011 | Parihar et al. | 345/175 |
| 2011/0163973 A1 | 7/2011 | Ording et al. | |
| 2011/0167382 A1* | 7/2011 | van Os | 715/800 |
| 2011/0181522 A1* | 7/2011 | Rendahl | 345/173 |
| 2011/0210923 A1* | 9/2011 | Pasquero et al. | 345/173 |
| 2011/0221776 A1* | 9/2011 | Shimotani et al. | 345/647 |
| 2011/0248948 A1* | 10/2011 | Griffin et al. | 345/174 |
| 2011/0252372 A1* | 10/2011 | Chaudhri | 715/835 |
| 2011/0264442 A1* | 10/2011 | Huang et al. | 704/9 |
| 2011/0302519 A1* | 12/2011 | Fleizach et al. | 715/773 |
| 2011/0317194 A1* | 12/2011 | Nakanishi | 358/1.13 |
| 2012/0036468 A1* | 2/2012 | Colley | 715/773 |
| 2012/0047454 A1* | 2/2012 | Harte | 715/773 |
| 2012/0113008 A1* | 5/2012 | Makinen et al. | 345/168 |
| 2012/0240069 A1* | 9/2012 | Kawalkar | 715/767 |
| 2012/0254786 A1* | 10/2012 | Colley | 715/773 |
| 2012/0304124 A1* | 11/2012 | Chen | G06F 9/4446 715/825 |
| 2012/0324391 A1* | 12/2012 | Tocci | 715/773 |
| 2013/0002560 A1* | 1/2013 | Chen et al. | 345/168 |
| 2013/0019191 A1* | 1/2013 | Arnold | 715/765 |
| 2013/0044053 A1* | 2/2013 | Galor et al. | 345/158 |
| 2013/0147752 A1* | 6/2013 | Simmons et al. | 345/174 |
| 2013/0182015 A1* | 7/2013 | Kuo et al. | 345/660 |
| 2013/0212487 A1* | 8/2013 | Cote | G06F 3/048 715/745 |
| 2013/0268879 A1* | 10/2013 | Zhang | G06F 3/0418 715/773 |
| 2013/0271381 A1* | 10/2013 | Lazaridis | G06F 3/0237 345/171 |
| 2013/0346904 A1* | 12/2013 | Do et al. | 715/773 |
| 2014/0032218 A1* | 1/2014 | Yeung | 704/270 |
| 2014/0040809 A1* | 1/2014 | Lee | 715/773 |
| 2014/0035823 A1* | 2/2014 | Khoe | G06F 3/02 345/171 |
| 2014/0098069 A1* | 4/2014 | Tseng | G06F 3/0418 345/178 |
| 2014/0101595 A1* | 4/2014 | Kumara et al. | 715/773 |
| 2014/0123051 A1* | 5/2014 | Ni | 715/773 |
| 2014/0235222 A1* | 8/2014 | Gonen | H04M 1/72519 455/418 |
| 2014/0344922 A1* | 11/2014 | Lam | G06F 21/629 726/19 |
| 2015/0121283 A1* | 4/2015 | Kangas | G06F 3/04886 715/773 |
| 2016/0042075 A1* | 2/2016 | Brett | G06F 17/30867 707/754 |

* cited by examiner

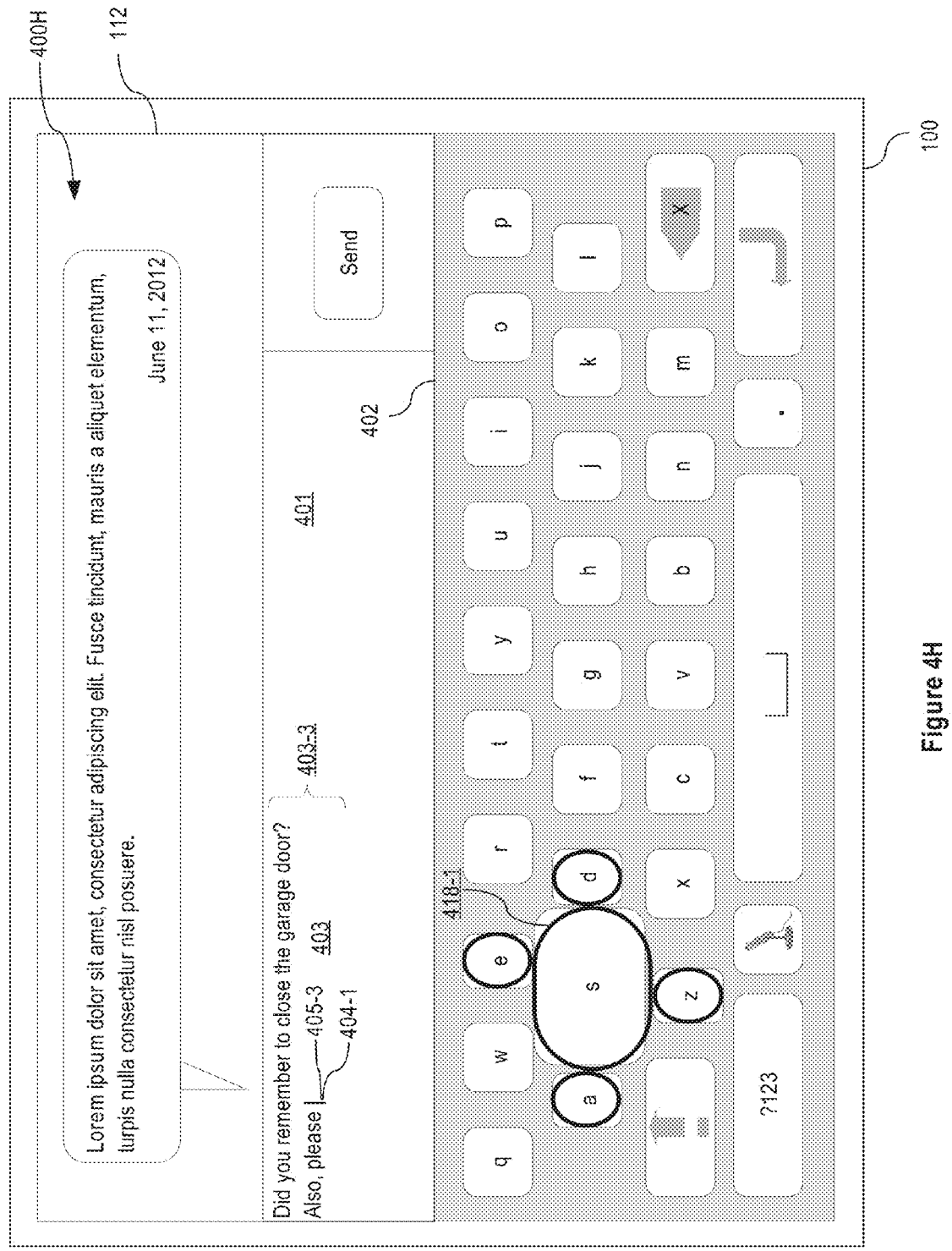

531

532 — Display a plurality of soft keys of a soft keyboard on the touch-screen display.

533 — Detect one or more input-affecting factors from:
- identity of a user of the computing device,
- a physical orientation of the computing device,
- lighting conditions in which the computing device is being used,
- a time of day, or
- whether the computing device is moving.

534 — In response to detecting the input-affecting factor(s), automatically select a keyboard profile of a plurality of keyboard profiles based on the input-affecting facto(s); and use the selected keyboard profile to determine which of the soft keys of the soft keyboard are selected by the user.

Figure 5D

TECHNIQUES FOR PREVENTING TYPOGRAPHICAL ERRORS ON SOFT KEYBOARDS

TECHNICAL FIELD

The disclosed embodiments relate generally to computing devices with touch-sensitive surfaces, and more particularly, to computing devices with touch-sensitive surfaces that receive input for selecting keys on a digital soft keyboard.

BACKGROUND

The use of touch-sensitive surfaces as input devices for computing devices has increased significantly in recent years. Exemplary touch-sensitive surfaces include touch pads and touch screen displays. Such surfaces are widely used to manipulate user interface objects on a display.

Exemplary manipulations include entering characters using one or more digital soft keyboards (or just "soft keyboard"). A user may need to perform such manipulation on user interface objects in any program or application where character input is needed.

But existing methods for using such soft keyboards are cumbersome and inefficient. For example, typographical errors on a soft keyboard occur too often, thereby wasting the user's time and the device's battery reserve, if the device is battery-operated.

SUMMARY

Accordingly, there is a need for computing devices to employ techniques for preventing typographical errors on soft keyboards. Such techniques may complement or replace conventional techniques for preventing typographical errors on software keyboards. Preventing typographical errors reduces the cognitive burden on a user and results in a more efficient human-machine interface. For battery-operated computing devices, preventing typographical errors conserves power and increases the time between battery charges.

In some embodiments, a method for preventing typographical errors on soft keyboards is performed at a computing device with a touch-screen display. According to the method, a plurality of soft keys of a soft keyboard is displayed on the touch-screen display. Each soft key covers an area of the touch-screen display. One or more occurrences of a particular typographical error in which a user erroneously selects an adjacent soft key in addition to or instead of an intended soft key are detected. In response, an activation region of the intended soft key is changed to cover a larger area of the touch-screen display than the area covered by the activation region of the intended soft key before the errors were detected, thereby decreasing the probability of the user making the same typographical error in the future.

In some embodiments, the method includes changing the activation region of the intended soft key by enlarging the activation region of the intended soft key along an axis of the activation region in a direction of the adjacent soft key.

In some embodiments, changing the activation region includes performing at least one of: increasing how much of the touch-screen display is covered by the activation region, changing a peripheral shape of the activation region, or shifting position of the activation region relative to the touch-screen display.

In some embodiments, the method includes changing the activation region of the intended soft key by enlarging the activation region equally in at least two different directions.

In some embodiments, the method includes changing an activation region of the adjacent soft key to cover a smaller area of the touch-screen display than the area covered by the adjacent soft key.

Instead of or in addition to changing the size of the activation region, in some embodiments the method includes decreasing activation sensitivity of the adjacent soft key by increasing the temporal offset associated with the adjacent soft key.

In some embodiments, the intended soft key is associated with a temporal offset and the method includes increasing activation sensitivity of the intended soft key by decreasing the temporal offset associated with the intended soft key.

In some embodiments, the intended soft key is mapped to a first symbol and the adjacent soft key is mapped to a second symbol. The method includes detecting occurrence of the particular error by detecting when, after the user selects the adjacent soft key to cause the second symbol to be displayed, the user replaces the second symbol with the first symbol.

In some embodiments, the method includes detecting occurrence of the particular error by detecting when the user accepts a suggested word that replaces the second symbol with the first symbol.

In some embodiments, the activation region of the intended soft key is changed only after detecting a predefined number of occurrences of the particular error.

In some embodiments, the user's erroneous selection of the adjacent soft key is associated with a touch location based on location data pertaining to touch input on the touch-screen display. The method further includes determining a distance parameter relating to the touch location and location of the intended soft key; and changing the activation region of the intended soft key is based, at least in part, on the distance parameter.

In some embodiments, after changing the activation region of the intended soft key, at least a portion of the activation region of the intended soft key overlaps the adjacent soft key on the touch-screen display.

In some embodiments, the activation region of the intended soft key is changed by modifying a keyboard profile, of a plurality of keyboard profiles, used by the computing device.

In some embodiments, the activation region of the intended soft key is changed only after detecting a predefined number of occurrences of the particular error. The method further includes, after a predefined period of time has lapsed, automatically increasing the number of occurrences of the particular error that are required to occur before the activation region of the intended soft key is changed.

In some embodiments, the activation region of the intended soft key is changed only after detecting a predefined number of occurrences of the particular error. The method includes allowing the user to specify one of a plurality of sensitivity levels. The predefined number of occurrences of the particular error that must occur before the activation region of the intended soft key is changed is based, at least in part, on the sensitivity level selected by the user.

In some embodiments, detecting occurrence of the particular error includes detecting that the erroneous selection of the adjacent soft key and the selection of the intended soft key are concurrent selections.

In some embodiments, a second method for preventing typographical errors on soft keyboards is performed at a computing device with a touch-screen display. A plurality of soft keys of a soft keyboard is displayed on the touch-screen display. Multiple occurrences of a particular error are detected in which a user erroneously selects a first soft key of the plurality of soft keys immediately followed by an erroneous selection of a second soft key of the plurality of soft keys. For each of the multiple occurrences of the particular error, the user intended to select the second soft key followed by a selection of the first soft key. The first soft key is mapped to a first symbol and the second soft key is mapped to a second symbol. Based at least in part on having detected the multiple occurrences of the particular error, display of the second symbol, the activation sensitivity of the first soft key is changed, and/or the activation sensitivity of the second soft key is changed.

In some embodiments, a third method for preventing typographical errors on soft keyboards is performed at a computing device with a touch-screen display. A plurality of soft keys of a soft keyboard is displayed on the touch-screen display. At least one input-affecting factor is detected. The input-affecting factors include, but are not limited to, identity of a user of the computing device, a physical orientation of the computing device, lighting conditions in which the computing device is being used, a time of day, and whether the computing device is moving. In response to detecting the input-affecting factor, a keyboard profile of a plurality of keyboard profiles is automatically selected based on the input-affecting factor. The selected keyboard profile is used to determine which of the soft keys of the soft keyboard are selected by the user.

Thus, computing devices with touch-sensitive surfaces are provided with new and improved methods and user interfaces for preventing typographical errors on soft keyboards, thereby increasing the effectiveness, efficiency, and user satisfaction with such devices. Such methods, devices, and interfaces may complement or replace existing methods, devices, and interfaces for preventing typographical errors on soft keyboards.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 4A-4L illustrate exemplary user interfaces for preventing typographical errors on soft keyboards in accordance with some embodiments.

FIGS. 5A-5D are flow diagrams illustrating method of preventing typographical error on soft keyboards in accordance with some embodiments.

DESCRIPTION OF EMBODIMENTS

Introduction

The following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

It will be understood that, although the terms first, second, etc. may be used herein to describe various elements, these elements should not be limited by these terms. These terms are only used to distinguish one element from another. For example, a first portion could be termed a second portion, and, similarly, a second portion could be termed a first portion, without departing from the scope of the present invention. The first portion and the second portion are both portions, but they are not the same portion, unless otherwise clearly indicated.

The terminology used herein is for the purpose of describing particular embodiments only and is not intended to be limiting of the invention. As used herein, the singular forms "a", "an", and "the" are intended to include the plural forms as well, unless the context clearly indicates otherwise. Use of "criteria" may indicate either or both of the singular usage of the term, "criterion", or the plural form "criteria", or vice versa.

It will also be understood that the term "and/or" as used herein refers to and encompasses any and all possible combinations of one or more of the associated listed items. It will be further understood that the terms "comprises" and/or "comprising", when used herein, specify the presence of stated features, integers, steps, operations, elements, components and/or groups, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event" or "in response to detecting [the stated condition or event]," depending on the context.

Figure 1:
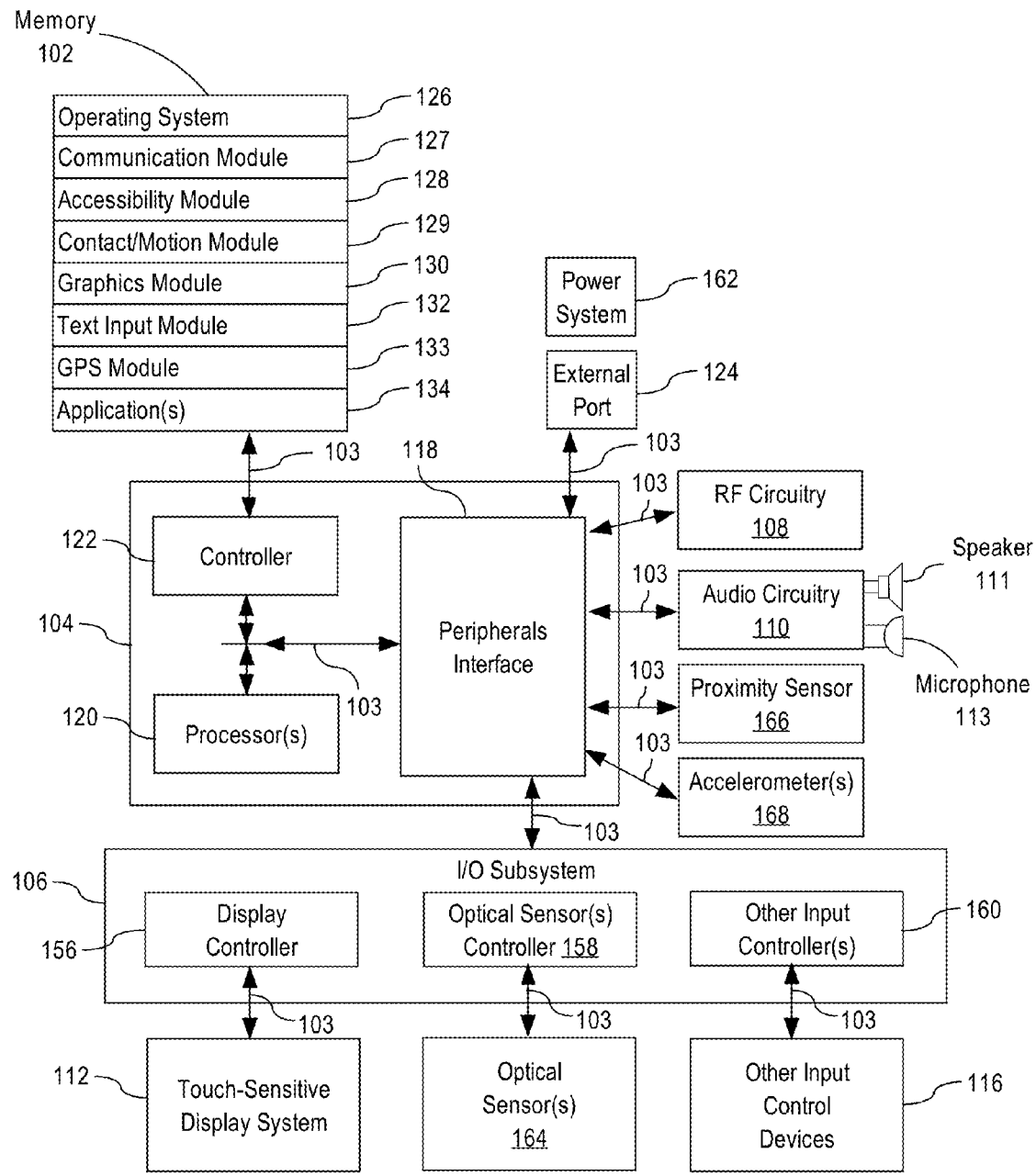
FIG. 1 is a block diagram of a portable computing device with a touch-sensitive display, according to some embodiments of the invention.
Figure 2:
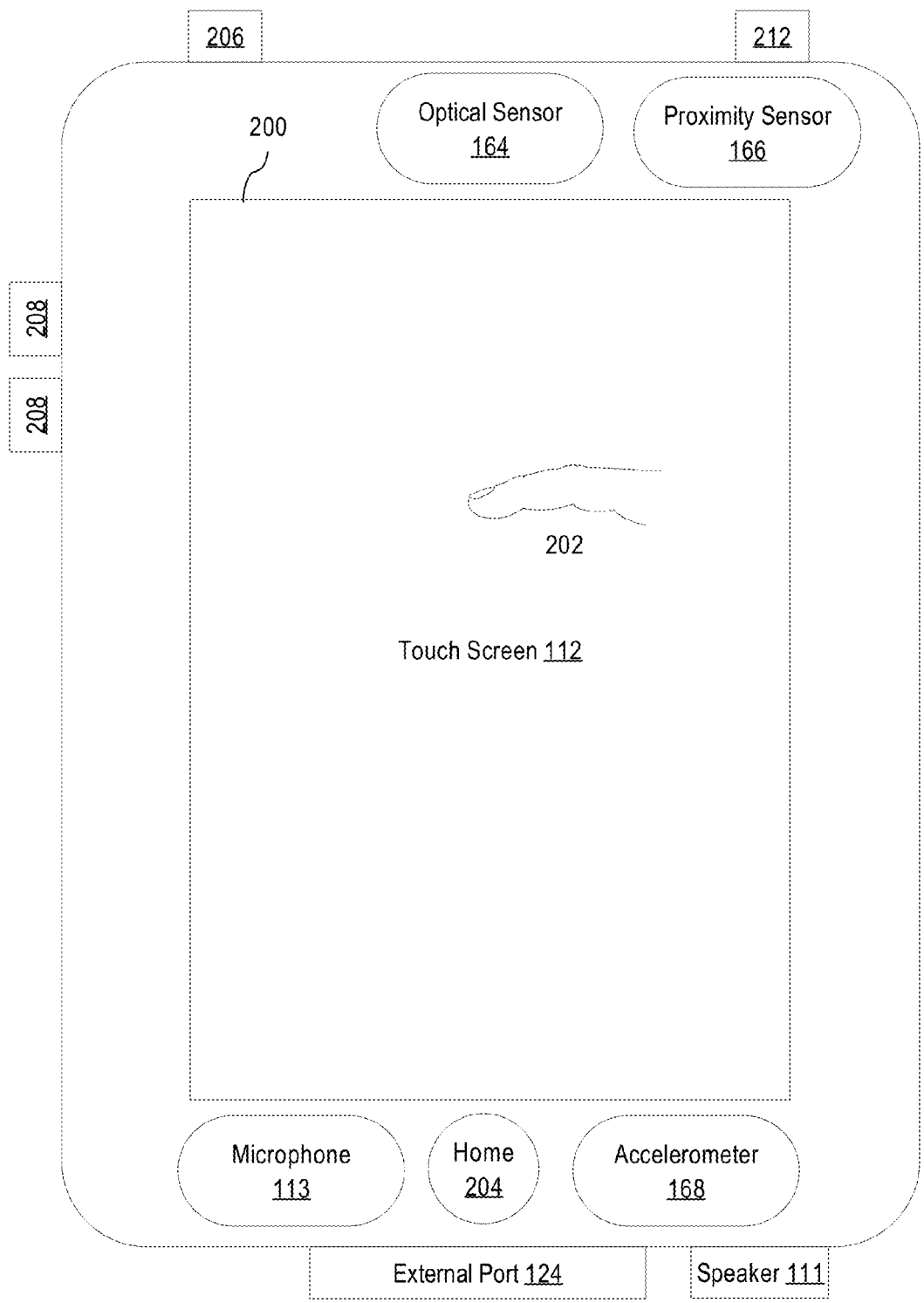
FIG. 2 illustrates a portable computing device in accordance with some embodiments.
Figure 3:
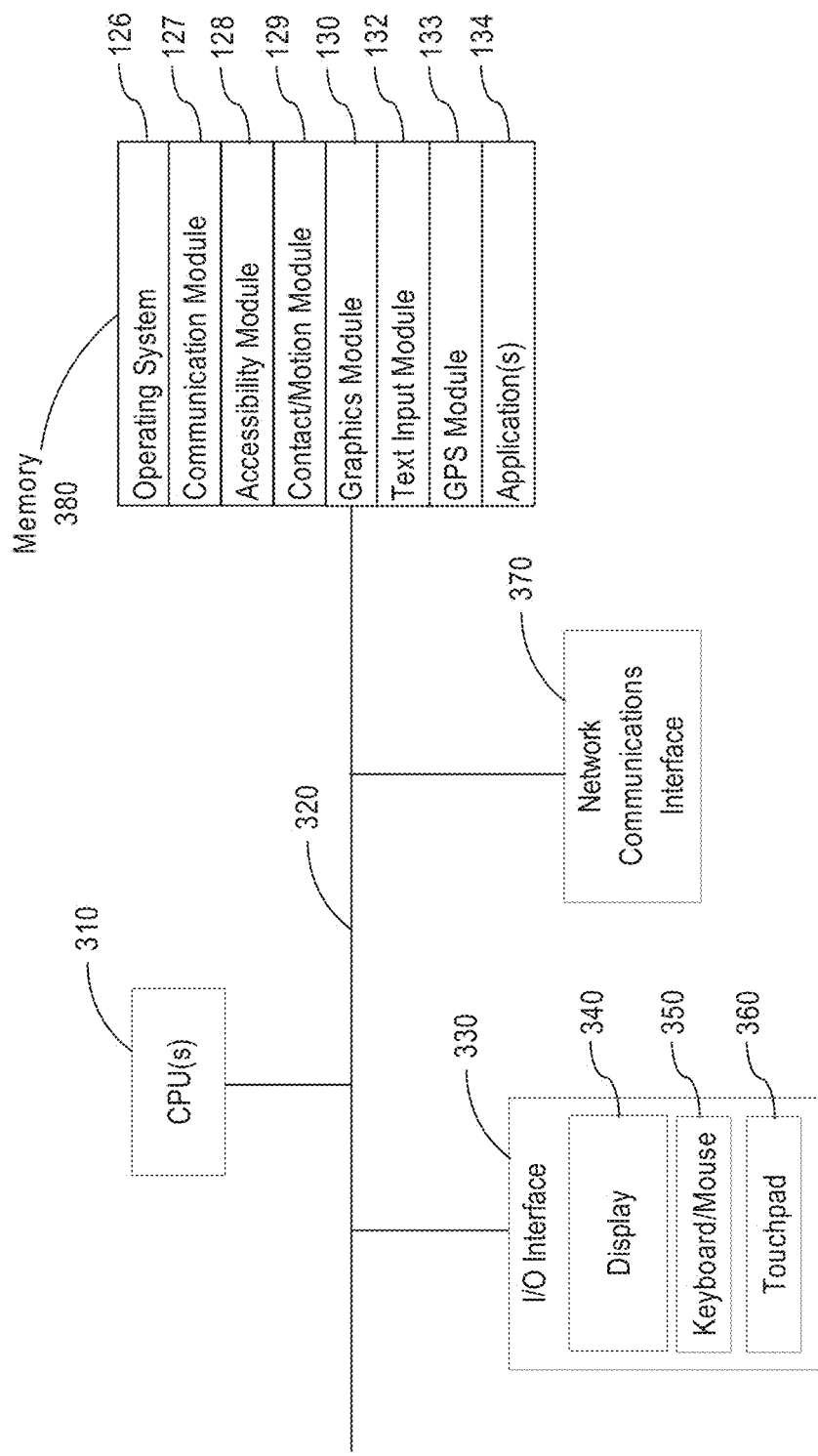
FIG. 3 is a block diagram of an exemplary computing device with a display and a touch-sensitive surface in accordance with some embodiments.

Attention is now directed towards exemplary embodiments of user interfaces ("UI") and associated processes that may be implemented on a computing device with a display and a touch-sensitive surface, such as device 300 of FIG. 3 or portable computing device 100 of FIGS. 1 and 2.

Exemplary User Interfaces for Preventing Typographical Errors on Soft Keyboards

FIGS. 4A-4L illustrate exemplary user interfaces and associated processes for preventing typographical errors on soft keyboards in accordance with some embodiments. The user interfaces in these figures are used to illustrate the processes described below, including the processes in FIGS. 5A-5D.

In FIGS. 4A-4L, some finger contact movement sizes and spacing between soft keys on soft keyboards may be exaggerated for illustrative purposes. No depiction in the figures bearing on finger contact movements or soft key spacing should be taken as a requirement or limitation for the purpose of understanding sizes and scale associated with the techniques disclosed herein.

Also in FIGS. 4A-4L, the display is a touch-screen display and the touch-sensitive surface is on the touch-screen display. However, in other embodiments, the display is not a touch-screen display and the touch-sensitive surface is a track pad or other touch-sensitive surface that is not on a touch-screen display. In these embodiments, touch gestures similar to the touch gestures described with respect to FIGS. 4A-4L as being performed on a touch-screen display may be performed on a track pad or other touch-sensitive surface to accomplish the same or equivalent results.

UI 400A (FIG. 4A) depicts an exemplary text input user interface for a text messaging application (e.g., an application 134 of device 100 (FIGS. 1 and 2)) on the touch screen 112 of device 100 (FIGS. 1 and 2). However, the techniques described herein for preventing typographical errors on soft keyboards can be used by any application and/or computing device operating system supporting the application that receives text character input from selections on a soft keyboard and the techniques are not limited to text messaging applications and/or device operating systems supporting text messaging applications.

In this example, the UI 400A includes a text entry region 401 and a QWERTY soft keyboard 402 below the text entry region 401. The text entry region 401 may include input text 403 with text 403-1 and a cursor 404-1 at current cursor position 405-1. While example embodiments are described and illustrated with respect to an exemplary QWERTY soft keyboard, the techniques for preventing typographical errors on soft keyboards are equally applicable to other types of soft keyboards including keyboards for selecting non-Latin characters and other non-standard keyboards. In some embodiments, the techniques described herein for preventing typographical errors on a soft keyboard are disabled or otherwise inactive when the soft keyboard is in a mode for entering special scientific characters or in a mode for entering only numeric characters.

The soft keyboard 402 includes one or more soft keys 406. Some of the soft keys 406 are associated with text characters. For example, soft key 406-6 is associated with the Latin small letter (lowercase) 'Y'. Some of the soft keys 406 are associated with non-text character input commands. For example, soft key 406-20 is associated with the Caps Lock command, soft key 406-29 is associated with a command to switch to another soft keyboard for inputting punctuation and numerical text characters, and soft key 406-30 is associated with a command to activate a microphone of the device 100 (FIGS. 1 and 2) for providing speech input.

Example embodiments are described herein with reference selections of soft keys associated with printed characters (e.g., printed Latin characters, the space character, the tab character, etc.). However, it should be understood that the techniques described herein for preventing typographical errors on soft keyboards are equally applicable to selection of soft keys associated with non-printed commands and to selections of soft keys associated with a mix of printed characters and non-printed commands. Exemplary non-printed command selections may include selection of a Caps Lock soft key or a soft key for activating a microphone for speech input.

Neighboring Soft Keys

A soft key on a soft keyboard may have one or more neighboring soft keys on the soft keyboard. In some embodiments, a neighboring soft key of a given soft key is a soft key that is next to, near, adjacent, adjoining, abutting, or bordering the given soft key on the soft keyboard. Soft keys neighboring a soft key a user intended to select are often unintentionally selected in addition to or instead of selecting the intended soft key. Techniques are provided herein for preventing typographical errors involving soft keys neighboring a soft key a user intended to select.

In some embodiments, a soft key is associated with one or more neighboring soft keys in one or more general compass point directions. For example, soft key 406-1 (for the Latin small letter 'Q') is associated with neighboring soft keys 406-2 (for the Latin small letter 'W') and 406-11 (for the Latin small letter 'A') in the east and southeast directions respectively. As another example, soft key 406-12 (for the Latin small letter 'S') is associated with neighboring keys 406-2, 406-3 (for the Latin small letter 'E'), 406-4 (for the Latin small letter 'R'), 406-13 (for the Latin small letter 'D'), 406-22 (for the Latin small letter 'X'), 406-21 (for the Latin small letter 'Z'), 406-20, and 406-11 in the northwest, north, northeast, east, southeast, south, southwest, and west directions respectively.

In some embodiments, only soft keys in the north, west, east, and south directions relative to a given soft key are treated as neighboring keys of the given soft key and soft keys in the northwest, northeast, southeast, and southwest directions are not treated as neighboring keys of the given soft key. For example, in this embodiment, soft keys 406-11, 406-3, 406-13, and 406-21 are neighboring soft keys of soft key 406-12 but soft keys 406-2, 406-4, 406-22, and 406-20 are not neighboring soft keys of soft key 406-12. More generally, not all soft keys that are next to, near, adjacent, adjoining, abutting, or bordering a given soft key need be considered a neighboring soft key of the given soft key.

In some embodiments, a soft key is associated with more than one neighboring soft key in a general compass point direction. For example, in this embodiment, soft key 406-31 (for the space character) is associated with neighboring soft keys 406-23 (for the Latin small letter 'C'), 406-24 (for the Latin small letter 'V'), and 406-25 (for the Latin small letter 'B') in the north direction, neighboring soft keys 406-21 and 406-22 in the northwest direction, and neighboring soft keys 406-26 (for the Latin small letter 'N') and 406-27 (for the Latin small letter 'M') in the northeast direction. In some embodiments, neighboring soft keys 4026-21 and 406-27 are not considered to be neighboring keys of soft key 406-31. In some embodiments, soft key 406-30 and soft key 406-32 (for the full stop character) to the west and east of soft key 406-31 respectively are neighboring soft keys of soft key 406-31. In this description, the terms "adjacent key" or "adjacent soft key" are synonymous with the term "neighboring soft key" as defined herein.

Activation Regions

A soft key of a soft keyboard is typically associated with an "activation region". An activation region is an area of a touch-sensitive surface which, if activated by certain touch input to the touch-sensitive surface within the area (e.g., a finger touchdown and lift off on the touch-sensitive surface within the area), causes the corresponding soft key to be selected. For example, UI 400B (FIG. 4B) illustrates a finger contact 407-1 on the touch screen 112. In this example, the contact 407-1 is at the location 408-1 on the touch screen 112 corresponding to the location of soft key 406-12 (for Latin small letter 'S'), which, in this example, also corresponds to the activation region 409-1 of the soft key 406-12.

While in some embodiments, the activation region of a soft key is visually indicated in the user interface, the activation region is not visually indicated in other embodiments. In some of the exemplary user interfaces of FIG. 4A-4L, the activation region of a soft key is visually indicated by a bolded border around the periphery of the activation region. However, visually indicated activation regions in the figures should not be taken as a requirement or limitation that activation regions be visually highlighted in the user interfaces.

In some embodiments, the activation region of a soft key 406 is the area indicated by the periphery of the soft key 406 as displayed on the touch screen 112. In accordance with embodiments described herein, in response to detecting a typographical error involving a soft key 406, the default activation region associated with the soft key 406 is automatically changed to no longer coincide with the periphery of the soft key 406 as displayed on the touch screen 112, with the aim of preventing future occurrences of the typographical error.

Activation Temporal Offset

In some embodiments, a soft key is associated with an activation temporal offset (or just "temporal offset"). In some embodiments, a temporal offset is an amount of time that certain touch input within the activation region of the soft key must be maintained before the soft key can be selected (e.g., maintaining a finger contact on the touch-sensitive surface within the area for at least a tenth of a second). Techniques are provided herein for preventing future typographical errors on soft keyboards by increasing or decreasing the temporal offset associated soft keys involved in typographical errors.

A soft key is not "selected" unless the certain touch input is detected for a duration that meets or exceeds the temporal offset of the soft key. Thus, in these embodiments, it is possible to quickly tap the activation region of a soft key with touch input and not cause the soft key to be selected. In some embodiments, the temporal offset of a soft key 406 is zero (or other minimum temporal offset value). In accordance with embodiments described herein, in response to detecting a typographical error involving a soft key 406, the default temporal offset associated with the soft key 406 is automatically changed, with the aim of preventing future occurrences of the typographical error.

Tap Select Gesture

Figure 4A:
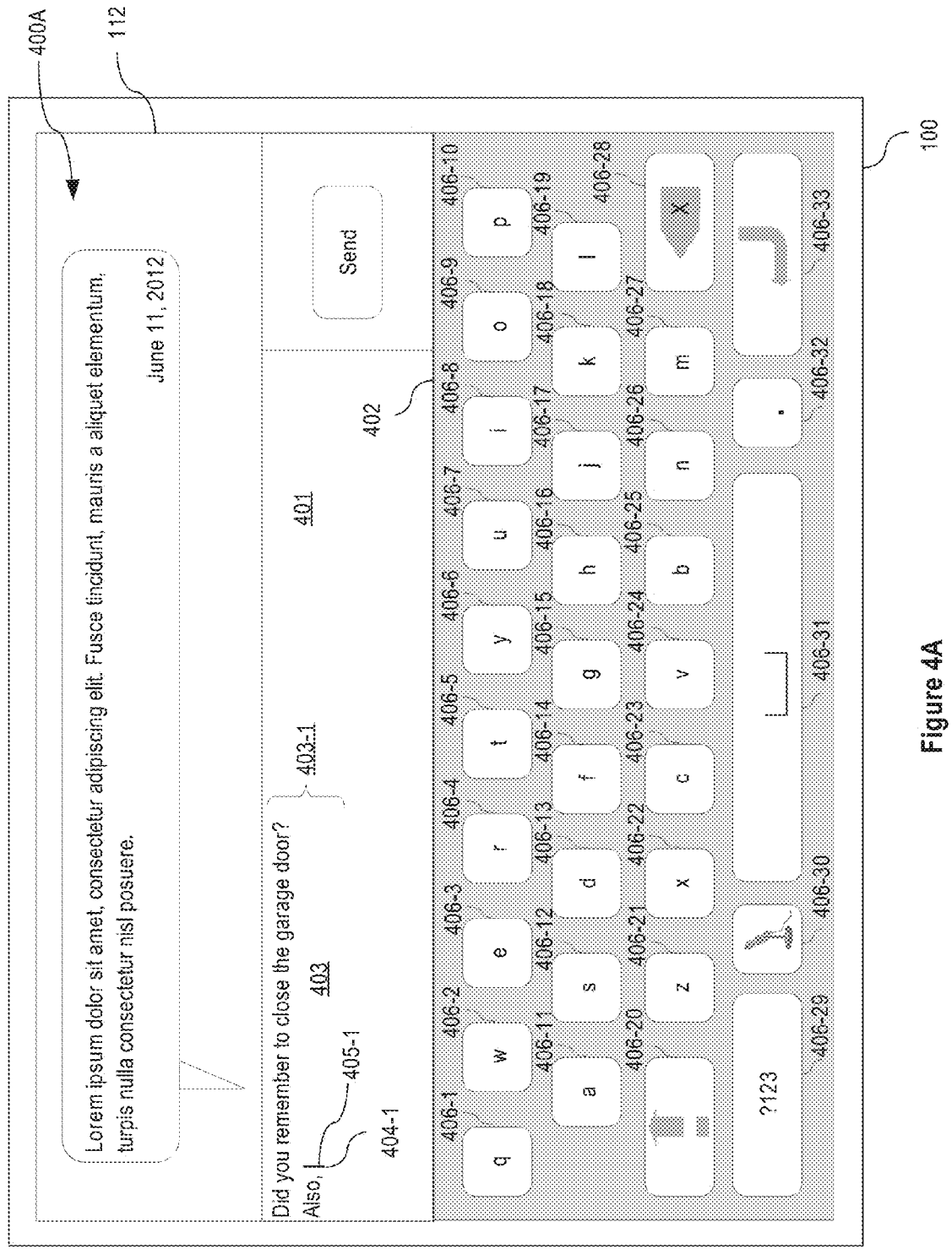
Figure 4B:
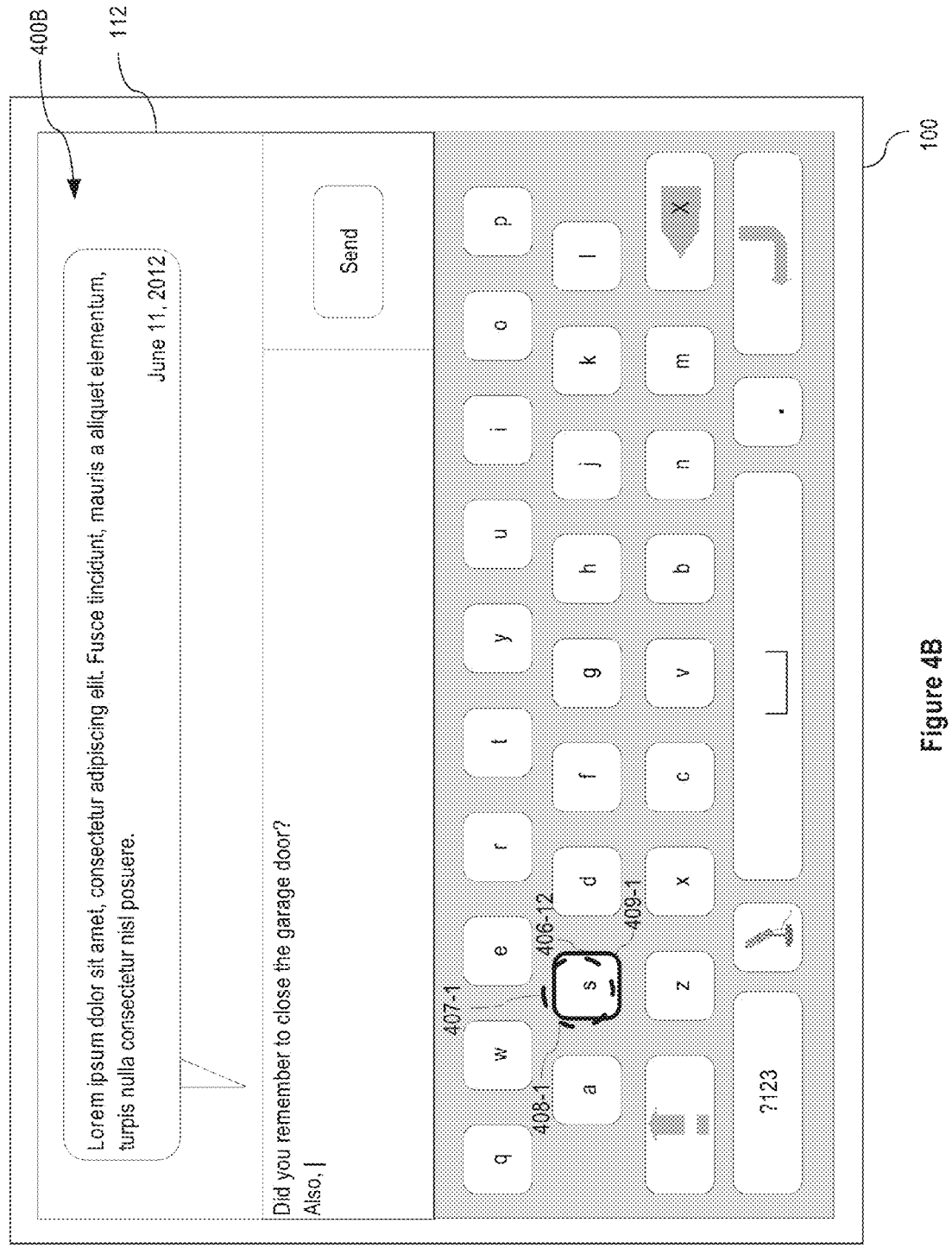
Figure 4C:
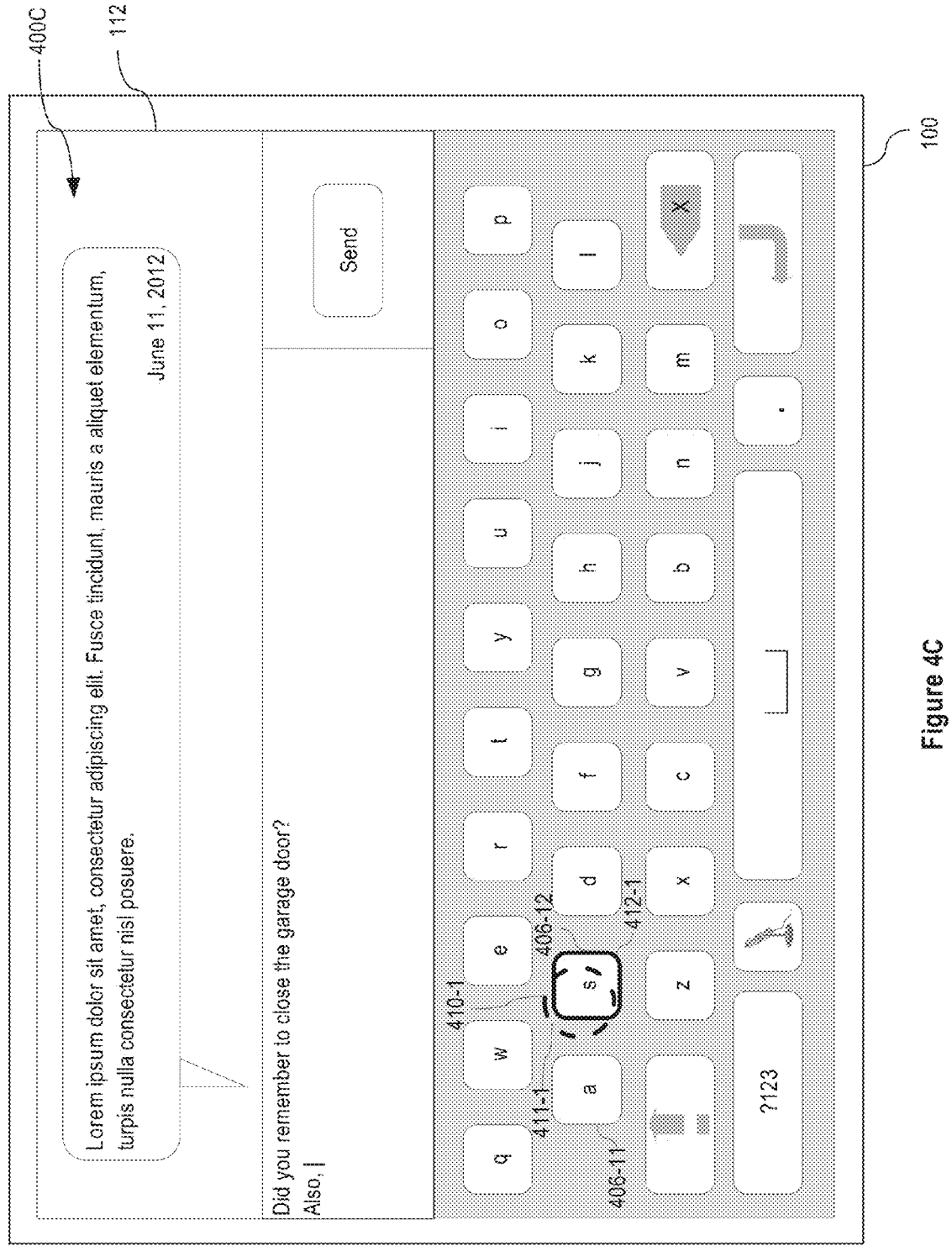

A first example of selecting a soft key 406 associated with a temporal offset will now be described with reference to FIG. 4C. The first example illustrates a "tap select" in which the touch input is initiated within the activation region of the soft key 406, maintained within the activation region for an amount of time corresponding to or exceeding the temporal offset associated with the soft key 406, and then released from the activation region. In this example, a finger contact 410-1 on the touch screen 112 is initiated (touch down) at location 411-1 on the touch screen 112 corresponding to the location of soft key 406-12 (for Latin small letter 'S'). In this example, the periphery the soft key 406-12 corresponds to the border of the activation region 412-1 of the soft key 406-12. The finger contact 410-1 is maintained (held) at location 411-1 for an amount of time that corresponds to or exceeds the temporal offset associated with soft key 406-12. After this amount of time has elapsed, the finger contact 410-1 is released (lift off) from location 411-1 on the touch screen 112 thereby causing the soft key 406-12 to be selected. In contrast, if the finger contact 410-1 is released before the temporal offset amount of time has elapsed, the release of the contact does not cause the soft key 406-12 to be selected. In this example, the selection of soft key 406-12 may or may not have been intentional. For example, the user may have intended to select neighboring soft key 406-11 (for the Latin small letter 'A') instead of soft 406-12.

Smudge Select Gesture

Figure 4D:
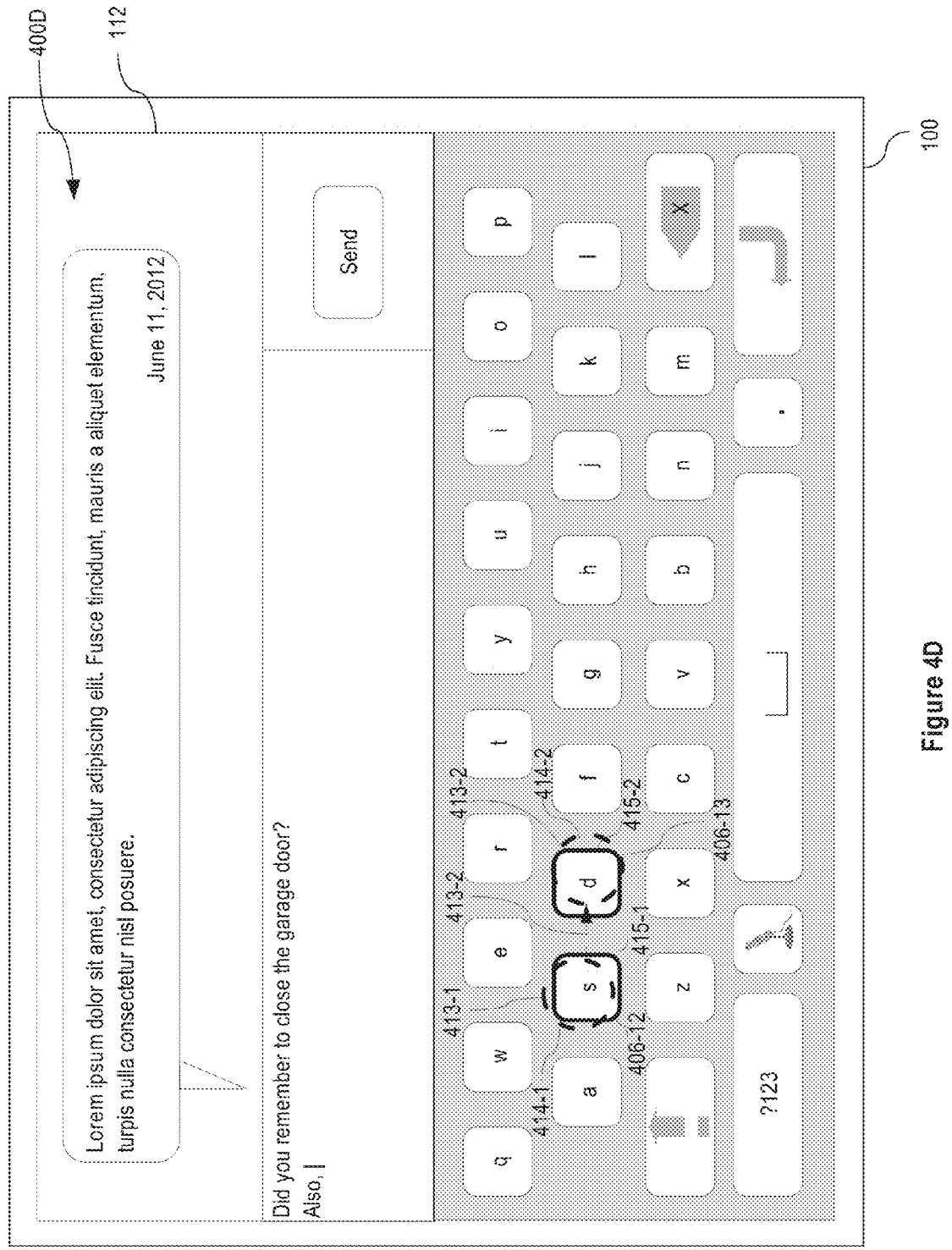
Figure 4E:
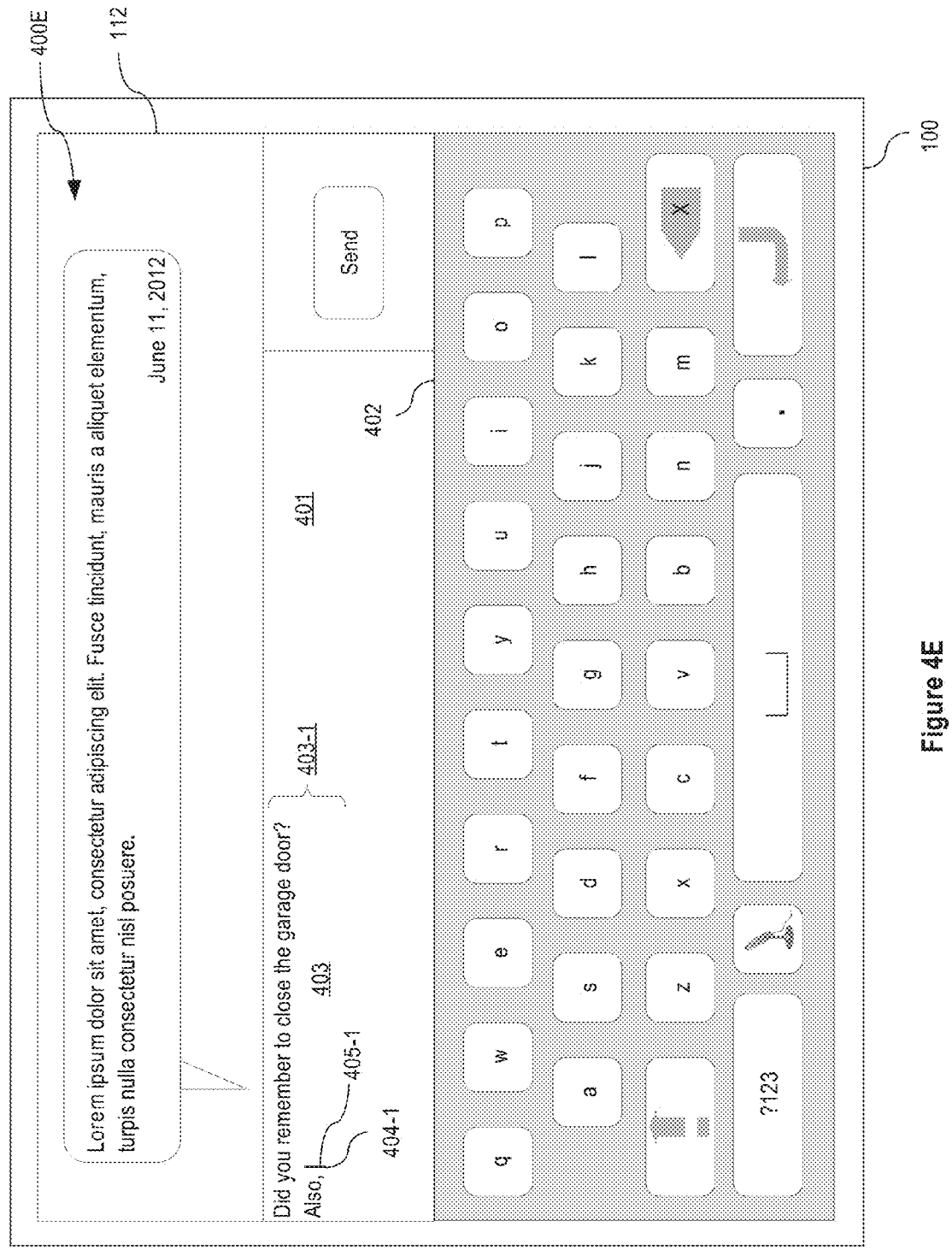
Figure 4F:
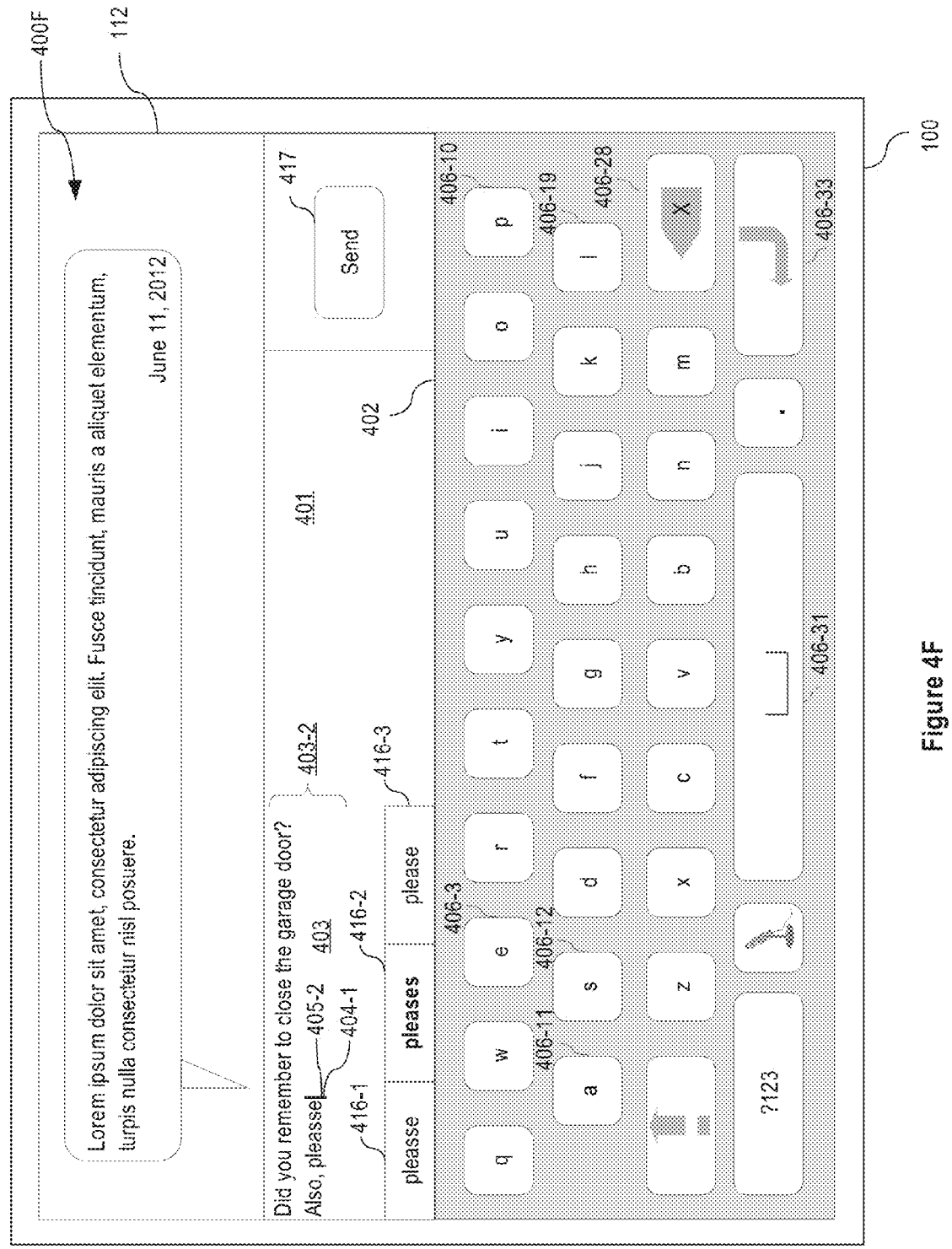
Figure 4G:
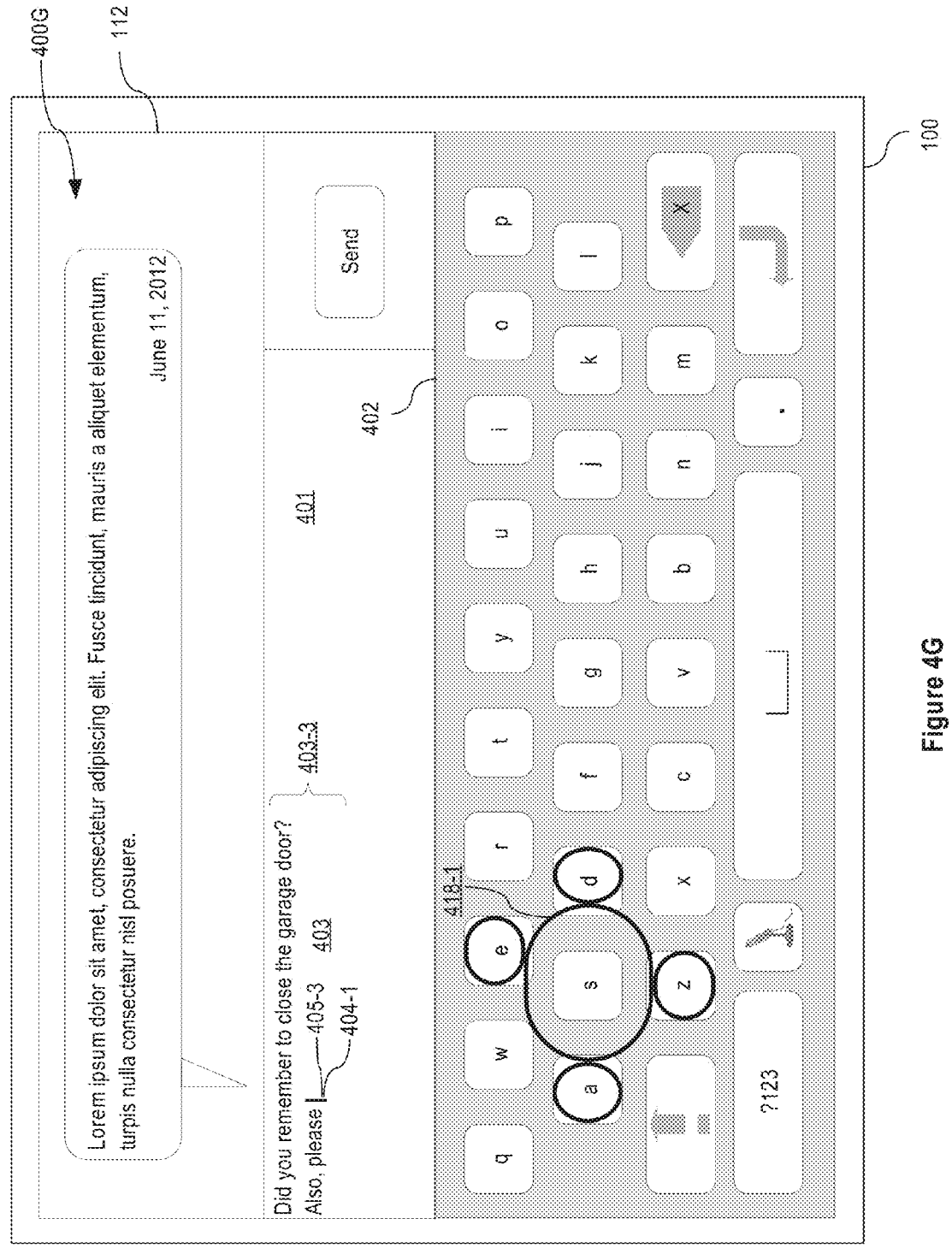
Figure 4I:
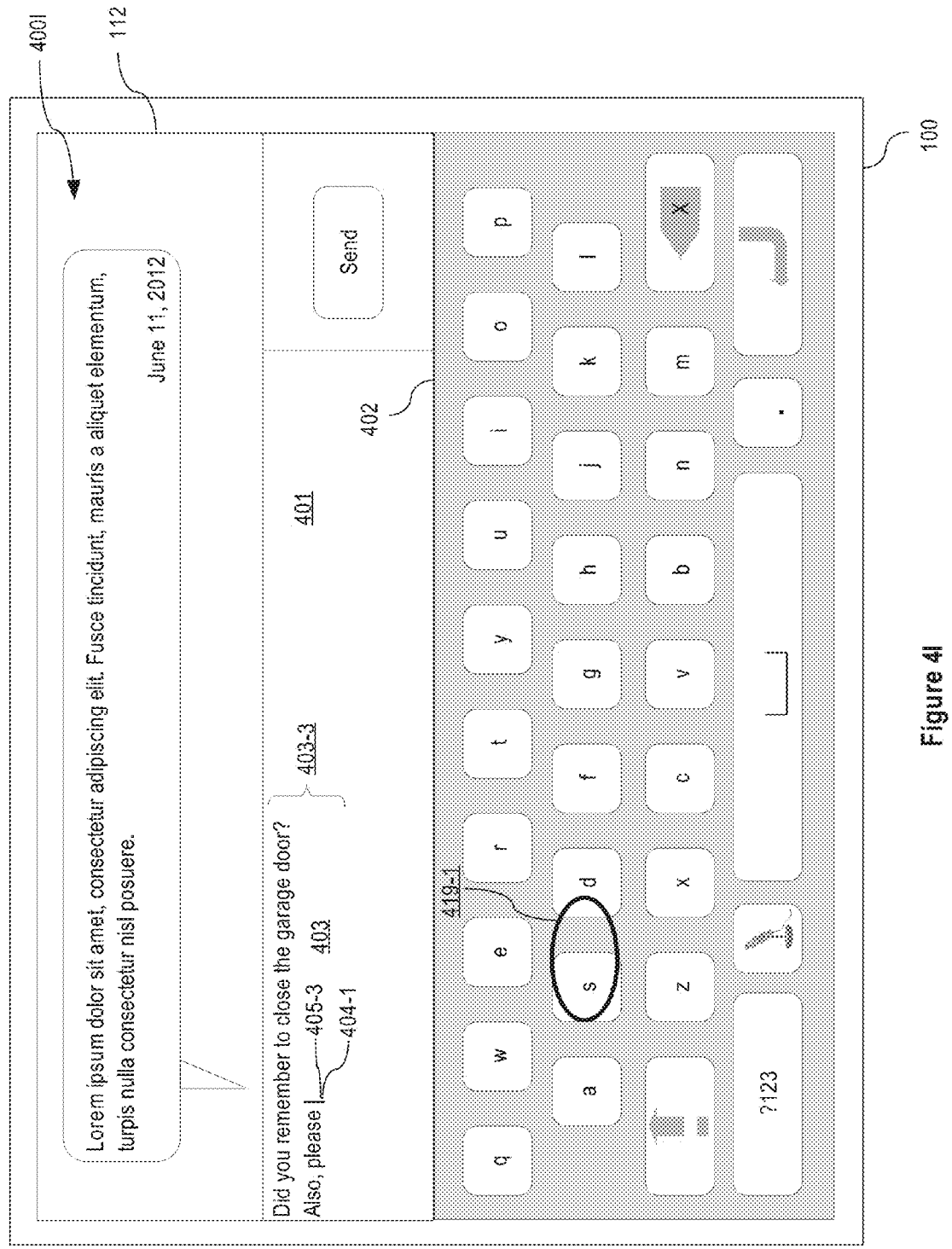

A second example of selecting a soft key 406 associated with a temporal offset will now be described with reference to FIG. 4D. The second example illustrates a "smudge select" in which the touch input is initiated within the activation region of a first soft key 406, moved to within the activation region of a second soft key 406, maintained within the activation region of the second soft key 406 for an amount of time corresponding to or exceeding the temporal offset associated with the second soft key 406, and then released from the activation region of the second soft key 406. In this example, a finger contact 413-1 on the touch screen 112 is initiated (touch down) at location 414-1 on the touch screen 112 corresponding to the location of soft key 406-12 (for the Latin small letter 'S'). In this example, the periphery of the soft key 406-12 corresponds to the border of the activation region 415-1 of the soft key 406-12. The finger contact 413-1 is then moved 413-2 across the touch screen 112 to location 414-2 while maintaining contact with the touch screen 112. The finger contact 413-3 is then maintained (held) at location 414-2 for an amount of time that corresponds to or exceeds the temporal offset associated with soft key 406-13 (for the Latin smaller letter 'D'). In this example, the periphery of soft key 406-13 corresponds to the border of the activation region 415-2 of the soft key 406-13. After the temporal offset amount of time has elapsed, the finger contact 413-3 is released (lift off) from location 414-2 on the touch screen 112 thereby causing the soft key 406-13 to be selected. In contrast, if the finger contact 413-3 is released before the temporal offset amount of time associated with soft key 406-13 has elapsed, the release of the contact does not cause the soft key 406-13 to be selected. In this example, the selection of soft key 406-13 may or may not have been intentional. For example, the user may have intended to select neighboring soft key 406-12 instead of soft key 406-13.

Exemplary Responses to Typographical Errors

In some embodiments, some or all of the responses to typographical errors contained in Table 1 may be taken by devices that present user interfaces with soft keyboards with the aim of preventing future occurrences of the typographical errors. In some embodiments, the response to a corresponding typographical error in Table 1 is taken only after a certain number of occurrences of the error are detected. In some embodiments, the magnitude of the response (e.g., the amount of increase to a temporal offset or the amount an activation region is enlarged) taken for a corresponding typographical error increases linearly, logarithmically, or exponentially as the number of times the response was previously taken to the typographical error increases. In some embodiments, the number of occurrences of a typographical error that must occur since the corresponding response was last taken before the response to the typographical error is taken again decreases linearly, logarithmically, or exponentially as the number of times the response was previously taken to the typographical error increases. In some embodiments, both the magnitude of the response increases linearly, logarithmically, or exponentially and the number of occurrences of the typographical error that must occur since the corresponding response was last taken before the response to the typographical error is taken again decreases linearly, logarithmically, or exponentially as the number of times the response was previously taken to the typographical error increases.

TABLE 1

Exemplary Responses to Typographical Errors

| Detected Typographical Error | Possible Response |
| --- | --- |
| Duplicate key error. For example, the same soft key is selected multiple times in succession and at least one of the multiple selections is not intended by the user. | Decrease the activation sensitivity of the duplicated soft key by increasing the temporal offset of the duplicated soft key. |
| Omitted key error. For example, the user unintentionally omits selection of a soft key in between intentional selections of soft keys. | Increase the activation sensitivity of the omitted soft key by decreasing the temporal offset of the soft key, if the temporal offset of the omitted soft key is greater than zero or other minimum temporal offset value. Additionally or alternatively, enlarge the activation region of the omitted key in all directions. |
| Swapped key error. For example, the user unintentionally selects a soft key when the user meant to select another soft key that neighbors the unintentionally selected soft key. | Enlarge the activation region of the intended key in the direction of the neighboring key. |
| Reversed key error. For example, the user unintentionally selects a first soft key followed by a second soft key when the user meant to select the second soft key followed by the first soft key. | Increase the activation sensitivity of the second soft key by decreasing the temporal offset of the second soft key, if the temporal offset of the second soft key is greater than zero or other minimum temporal offset value. Additionally or alternatively, decrease the activation sensitivity of the first soft key by increasing the temporal offset of the first soft key. Additionally or alternatively, enlarge the activation region of the second soft key. Additionally or alternatively, contract the activation region of the first soft key. |
| Concurrent neighboring key error. For example, the user concurrently selects an intended soft key and a neighboring soft key when the user meant to select only the intended soft key. | Enlarge the activation region of the intended key in the direction of the neighboring key. Additionally or alternatively, decrease the temporal sensitivity of the neighboring key by increasing the temporal offset of the neighboring key. |

The possible responses to detected typographical errors in Table 1 are merely exemplary. In some embodiments, the responses taken to detected typographical errors are user configurable, e.g., via a settings or options menu. In some embodiments, the response taken to a detected typographical errors may vary depending on one or more input-affecting factors such as the identity of the user of the device, the physical orientation of the device, the lighting conditions in which the device is being used, the time of day (e.g., daytime or nighttime), and/or whether the device is moving (e.g., according to GPS module 133 of device 100 (FIGS. 1 and 2)).

Example Typographical Error

UI 400E-UI 400F (FIGS. 4E-4F) are exemplary user interfaces illustrating an exemplary typographical error in accordance with some embodiments. In this example, the UI 400E includes the text entry region 401 and the QWERTY soft keyboard 402 below the text entry region 401. The text entry region 401 includes input text 403 with text 403-1 and a cursor 404-1 at current cursor position 405-1.

UI 400F shows the user interface after the soft keys 406-10 (for the Latin small letter 'P'), 406-19 (for the Latin small letter 'L'), 406-3 (for the Latin small letter 'E'), 406-11 (for the Latin small letter 'A'), 406-12 (for the Latin small letter 'S'), 406-12 (again), and 406-3 (for the Latin small letter 'E') are each selected (e.g., by a tap select or a smudge select) in that order. Accordingly, the text entry region 401 now includes input text 403 with text 403-2 and the cursor 404-1 at new current cursor position 405-2. In this example, the soft key 406-12 was selected twice in succession when only one selection of soft key 406-12 was intended (i.e., a duplicate key error).

Suggested Replacement Words

Also in this example, the text messaging application has automatically provided suggested replacement words 416 in response to the user's selection of the text "pleasse". One of the suggested replacement words, 416-2 (highlighted in bold in FIG. 4F), is the default suggested replacement word that will automatically replace the user's selection of "pleasse" with the word "pleases" if the user indirectly accepts the default replacement word by performing a user interface action that indicates such acceptance. Some possible user interface actions that could indicate indirect acceptance of the default suggested replacement word include, but are not limited to, selecting a soft key corresponding to a whitespace character (e.g., soft key 406-31 for the space character or soft key 406-33 for the carriage return character) and touch input (e.g., a finger tap) to the region of the touch screen 112 where the send button 417 is displayed.

Alternatively, the user can directly accept a suggested replacement word 416 by touch input (e.g., a finger tap) to the region of the touch screen 112 where the desired suggested replacement word 416-1, 416-2, or 416-3 is displayed. For example, if the user desires to replace "pleasse" with "please", the user could provide touch input to the region of the touch screen 112 where the suggested replacement word 416-3 is displayed.

Duplicate Key Error

In some embodiments, a duplicate key error is detected when the user replaces multiple successive selections of the same soft key with at least one selection of the soft key but less than all of the multiple successive selections. For example, a duplicate key error may be detected upon occurrence of each of the following: when the selection "pplease" is replaced with "please", when the selection "pleasse" is replaced with "please", when the selection "occccasion" is replaced with "occasion", and when the selection "pleasee" is replaced with "please". For example, referring to UI 400F (FIG. 4F), from the current cursor position 405-2, a duplicate key error is detected when the user replaces the selection "pleasse" with "please" by selecting the backspace soft key 406-28 twice followed by a selection of soft key 406-3 (for the Latin small letter 'E').

In some embodiments, a duplicate key error is detected when the user replaces two successive selections of the same soft key with one selection of the soft key. In these embodiments, replacing the selection "occccasion" with "occasion" would constitute two separate duplicate key errors.

In some embodiments, a duplicate key error is detected when the user indirectly or directly accepts a suggested replacement word that replaces multiple successive selections of the same soft key with at least one selection of the soft key but less than all of the multiple successive selections. For example, referring again to UI 400F (FIG. 4F), a duplicate key error is detected if the user indirectly or directly accepts one of suggested replacement words 416-2 ("pleases") or 416-3 ("please") to replace the selection "pleasse".

In some embodiments, an indirect acceptance of the default suggested replacement word is not detected as a duplicate key error (or any other type of typographical error) if, after indirectly accepting the default suggested replacement word, the user replaces the default suggested replacement word with the original selection. For example, in these embodiments, a duplicate key error is not detected if the user indirectly accepts the default suggested replacement word "pleases" to replace "pleasse" and then subsequently replaces "pleases" with the original selection "pleasse". This type of indirect acceptance of the default suggested replacement word with a subsequent reversion by the user to the original selection may not be detected as a duplicate key error (or any other type of typographical error) because the reversion to the original selection indicates that the user accidentally or unintentionally indirectly accepted the default suggested replacement word.

Response to Duplicate Key Errors

In some embodiments, in response to detecting a duplicate key error involving a given soft key, the activation sensitivity of the given soft key is decreased by increasing the temporal offset of the given soft key thereby making it more difficult to select the given soft key with a touch gesture (e.g., a tap select gesture or smudge select gesture) and thus decreasing the probability of unintentionally making multiple successive selections of the given soft key with multiple successive touch gestures in the future. For example, the temporal offset may be incremented by a predetermined unit of time (e.g., by one-tenth of a second or by 10% of the current temporal offset).

In some embodiments, the increased temporal offset is effective only after an initial selection of the given soft key is made and before a next selection of a soft key other than the given soft key is made. After the initial selection of the given soft key, the temporal offset is increased from its initial temporal offset value (i.e., the current value of the temporal offset) thereby making it less likely to incorrectly make multiple successive selections of the given soft key with multiple successive touch gestures (e.g., multiple successive tap select gestures and/or smudge select gestures). When the user next selects a soft key other than the given soft key, the temporal offset of the given soft key is reset to the initial temporal offset for the next initial selection of the given soft key. Thus, in these embodiments, the activation sensitivity for the initial selection of the given soft key remains the same. Based on detecting the previous duplicate key errors involving the given soft key, the initial selection of the given soft key relative to subsequent successive selections of the given soft key is more likely to be an intended selection of the given soft key. However, in these embodiments, the activation sensitivity for the second and subsequent successive selections of the given soft key is decreased. Based on detecting the previous duplicate key errors involving the given soft key, the second and subsequent successive selections of the given soft key relative to the initial selection of the given key soft are more likely to be unintended selections of the given soft key. Thus, increasing the temporal offset of the given soft key only after an initial selection of the given soft key has been made is a technique that can be utilized to prevent duplicate key errors but that does not frustrate the user in making the initial selection.

In some embodiments, the temporal offset of the given soft key is increased only after a predetermined number (e.g., 10) of occurrences of a duplicate key error involving the given soft key are detected. In some embodiments, the temporal offset of the given soft key is increased linearly, logarithmically, or exponentially as the number of times the temporal offset of the given soft key was previously increased increases. In some embodiments, the number of occurrences of a duplicate key error involving the given soft key that must occur since the temporal offset of the given soft key was last increased before the temporal offset of the given soft key is increased again decreases linearly, logarithmically, or exponentially as the number of times the temporal offset of the given soft key was previously increased increases. In some embodiments, both the temporal offset of the given soft key is increased linearly, logarithmically, or exponentially and the number of occurrences of a duplicate key error involving the given soft key that must occur since the temporal offset of the given soft key was last increased before the temporal offset of the given soft key is increased again decreases linearly, logarithmically, or exponentially as the number of times the temporal offset of the given soft key was previously increased increases.

Omitted Key Error

In some embodiments, an omitted key error is detected when the user inserts one or more selections of a given soft key between soft key selections already made. For example, an omitted key error may be detected in each of the following cases: when the selection "lease" is replaced with "please" ('p' is inserted between the leading space and 'l'), when the selection "pleae" is replaced with "please" ('s' is inserted between 'a' and 'e'), and when the selection "pleas" is replaced with "please" ('e' is inserted between 's' and the trailing space). The insertion of the omitted soft key can be made manually (e.g., by deleting soft key selections and inserting new soft key selections that replace the deleted soft key selections) or by accepting a suggested replacement word (e.g., indirectly or directly accepting "please" to replace "pleae").

Response to Omitted Key Errors

In some embodiments, in response to detecting an omitted key error involving a given soft key, the activation sensitivity of the given soft key is increased by decreasing the temporal offset of the given soft key thereby making it easier to select the given soft key with a touch gesture (e.g., a tap select gestures or smudge select gesture) and thus decreasing the probability that the given soft key is unintentionally omitted when making soft key selections in the future. For example, the temporal offset may be decremented by a predetermined unit of time (e.g., one-tenth of a second). Note that the temporal offset may not be decremented at all if the temporal offset for the given key is already set at zero (or other minimum temporal offset value). Even if current temporal offset before the decrement is greater than zero (or other minimum temporal offset value), the temporal offset in some embodiments is never decremented to be less than zero (or other minimum temporal offset value).

In some embodiments, in response to detecting an omitted key error involving a given soft key, the activation region of the given soft key is enlarged to cover a larger area of the touch-sensitive surface thereby making it easier to select the given soft key with a touch gesture (e.g., a tap select gesture or smudge select gesture) and thus decreasing the probability that the given soft key is unintentionally omitted when making soft key selections in the future. For example, referring to UI 400G (FIG. 4G), it includes the text entry region 401 and the QWERTY soft keyboard 402 below the text entry region 401. The text entry region 401 includes input text 403 with text 403-3 and a cursor 404-1 at current cursor position 405-3. In addition, the activation region 418-1 for the 's' soft key has been enlarged to cover portions of the 'e' soft key, 'the 'd' soft key', the 'z' soft key, and the 'a' soft key. To prevent overlap of activation regions, each of the activation regions for the 'e' soft key, 'the 'd' soft key', the 'z' soft key, and the 'a' soft key are correspondingly reduced to cover a smaller area of the touch-sensitive surface to avoid overlap with the enlarged activation region for the 's' soft key. A touch gesture (e.g., a tap select gesture or smudge select gesture) within activation region 418-1 will cause selection of the 's' soft key to be made. Note that in this example, the soft key themselves are not enlarged or reduced. However, in other embodiments, when an activation region of a soft key is enlarged or reduced, the soft key itself is also enlarged or reduced. An example of this is given in UI 400H (FIG. 4H). In UI 400H, as well as enlarged the activation region 418-1 for the 's' soft key and reducing the activation regions for the 'e' soft key, 'the 'd' soft key', the 'z' soft key, and the 'a' soft key, the 's' soft key is also enlarged and the 'e' soft key, 'the 'd' soft key', the 'z' soft key, and the 'a' soft key are each reduced.

Activation Region Shapes and Sizes

The shape of an activation region of a soft key can be varied. In some embodiments, the shape of an activation region corresponds to the shape of the soft key (e.g., a square or rectangle with or without rounded corners). In some embodiments, the shape of an activation region is a circle or oval centered on the centroid of the soft key. In some embodiments, the shape of an activation region is polygon centered on the centroid of the soft key.

In some embodiments, in response to detecting an error, the activation region of a soft key is enlarged along an axis in the direction of a neighboring key. For example, referring to UI 400I (FIG. 4I), the oval-shaped activation region 419-1 is enlarged along a horizontal axis in the direction of the neighboring 'd' soft key. As explained in greater detail below, an activation region for a given soft key may be enlarged along an axis in the direction of a neighboring soft key in response to detecting certain typographical errors involving the given soft key and the neighboring soft key (e.g., a swapped key error). This type of directional enlargement decreases the probability of future occurrences of the certain errors involving the given soft key and the neighboring soft key.

Figure 4J:
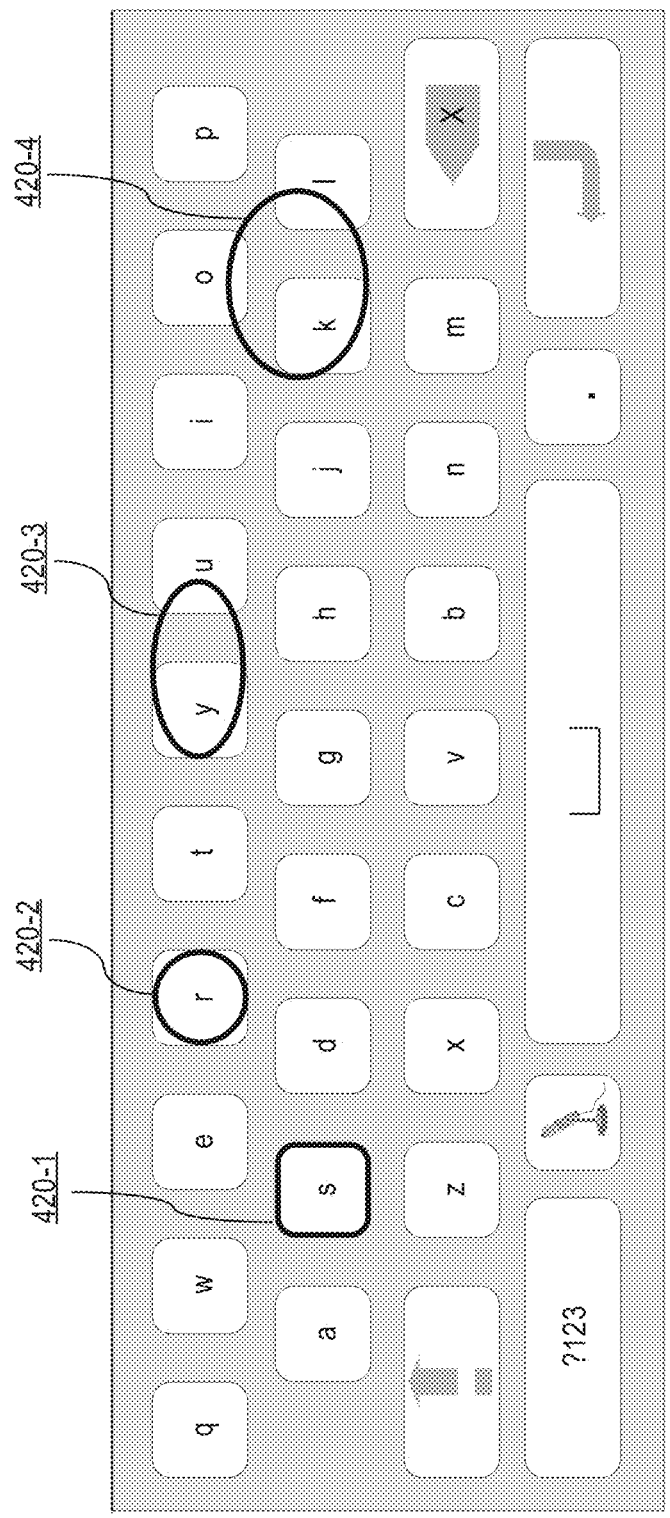
Figure 4K:
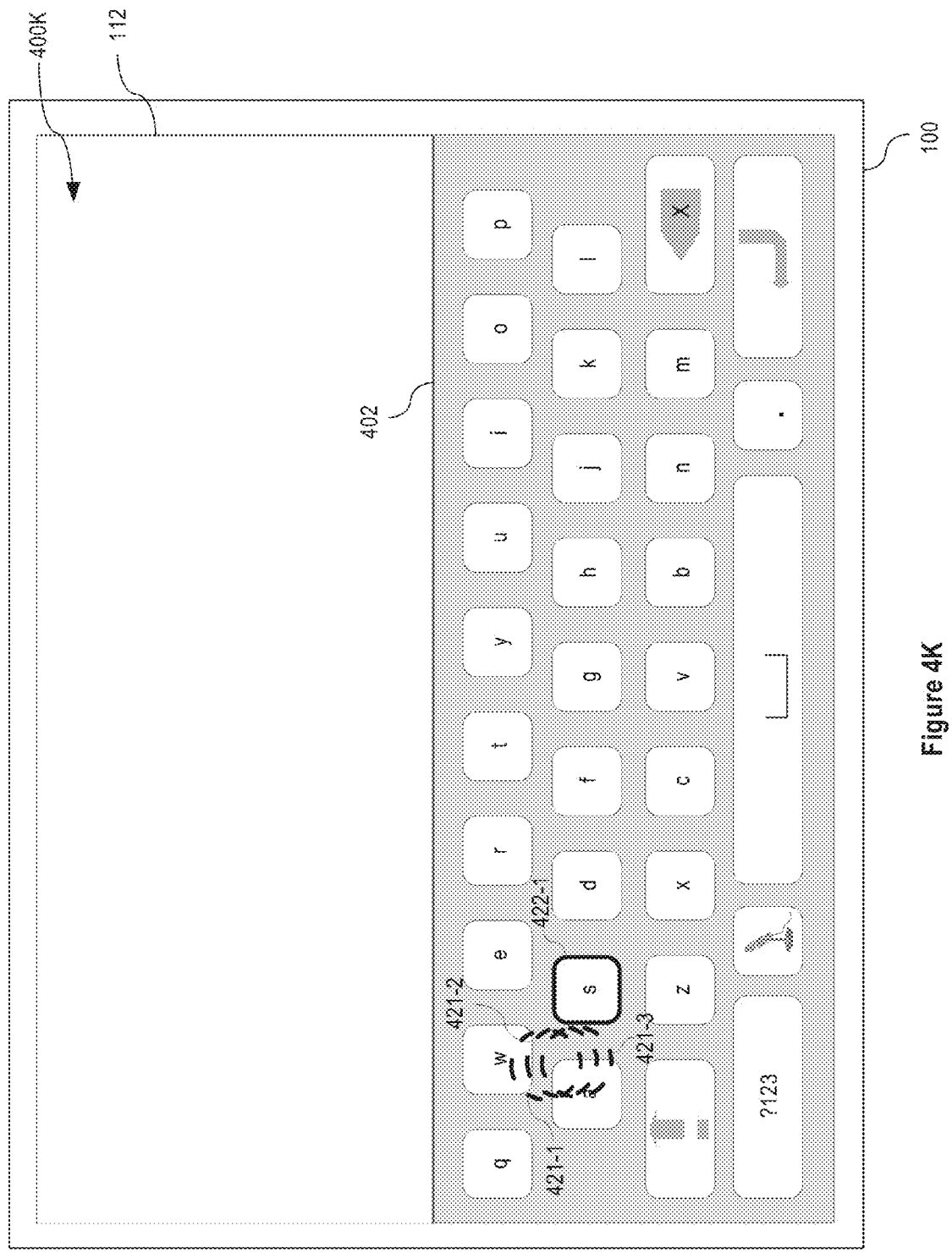
Figure 4L:
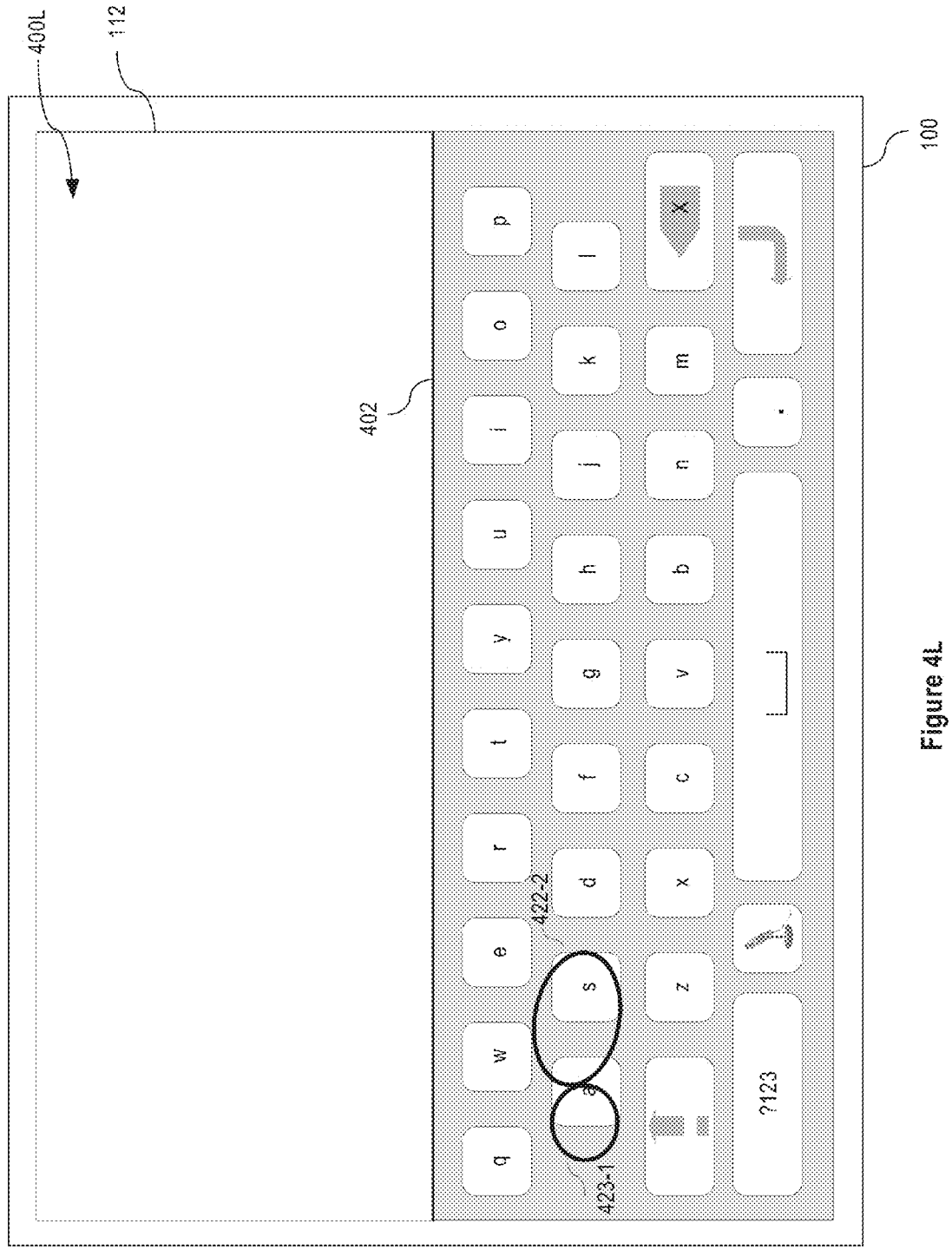

FIG. 4J illustrates some exemplary activation regions for soft keys. An activation region for a soft key can be congruent with the periphery of the soft key (e.g., activation region 420-1 for the 's' soft key as shown in FIG. 4J). An activation region for a soft key can be wholly contained within the region of the soft key (e.g., activation region 420-2 for the 'r' soft key as shown in FIG. 4J). An activation region can cover all or a portion of the region of the soft key and a portion of the region of a neighboring soft key (e.g., activation region 420-3 for the 'y' soft key covers a portion of the 'y' soft key and a portion of the 'u' soft key as shown in FIG. 4J). An activation region can cover all or a portion of the region of the soft key and portions of the regions of two or more neighboring soft keys (e.g., activation region 420-4 for the 'k' soft key covers a portion of the 'o' soft key and a portion of the 'l' soft key). Other activation region shapes, sizes, and configurations are possible and activation regions are not limited to the example shapes, sizes, and configurations illustrated in FIG. 4J.

In some embodiments, activation regions of soft keys do not overlap. In these embodiments, when an activation region for a soft key is enlarged, the activation regions for neighboring soft keys are reduced or contracted to avoid overlap. In other embodiments, activation regions are allowed to overlap. In these embodiments, touch input directed to overlapping portions of activation regions may be interpreted according to techniques described in in U.S. Patent Publication No. 20080165160, "Portable Multifunction Device, Method, and Graphical User Interface for Interpreting a Finger Gesture on a Touch Screen Display," the entire contents of which is incorporated by reference herein. Such techniques may be used to resolve ambiguity about which soft key the user intended to select when touch input is directed to overlapping portions of activation regions.

Recording Touch Locations of Soft Key Selections

In some embodiments, when the user makes a selection of a soft key involved in a typographical error (e.g., a swapped key error, a reversed key error, or a concurrent neighboring key error), the touch location of the selection is recorded in a computer memory of the device. In some embodiments, a recorded touch location includes y-coordinate and x-coordinate information identifying the touch location. For example, a recorded touch location may include such information as a y-coordinate of the touch location relative to a graphical user interface viewport, including or excluding any scroll offset and an x-coordinate of the touch location relative to a graphical user interface viewport, including or excluding any scroll offset. Additionally or alternatively, a recorded touch location may include such information as a y-coordinate of the touch location relative to the display screen and an x-coordinate of the touch location relative to the display screen.

In some embodiments, the recorded touch locations are used by the device when enlarging the activation region of a given soft key that neighbors the soft key for which the touch locations were recorded and that was also involved in the typographical error. In particular, the recorded touch locations are used to determine the direction and magnitude of the enlargement of the activation region of the given soft key. By taking into account the recorded touch locations when enlarging the activation region of the given soft key, the activation region can be enlarged in a way that decreases the probability that the same typographical error involving the same two keys will occur in the future.

In some embodiments, a history of touch locations of the last n soft key selections is stored in memory of the device. The number n may be based on a variety of factors including the size of the memory and the number of soft key selections required to detect typographical errors. When a new soft key selection is made, the touch location of the oldest soft key selection in the history is expunged and the touch location of the new soft key selection is added to the history as the touch location of the most recent soft key selection.

When a typographical error is detected, touch location information in the history for soft keys involved in the error is collected from the history and recorded in memory of the device as part of a new typographical error record. The record may contain such information as the soft keys involved in the error, the type of error, and the touch locations of the soft keys involved in the error among other information. In this way, a separate history of typographical error records is collected in the memory of the device. Such records may be organized in the memory in a variety of different ways including, for example, by error type.

Using Recorded Touch Locations in Response to Detecting Typographical Errors

UI 400K (FIG. 4K) illustrates a history of touch locations for three separate occurrences of a swapped key error in which the user intended to select the 's' soft key each time but accidentally selected the 'a' soft key each time instead. On the first occurrence of the swapped key error, the user selected the 'a' soft key at location 421-1. On the second occurrence of the swapped key error, the user selected the 'a' soft key at location 422-2. On the third occurrence of the swapped key error, the user selected the 'a' soft key at location 422-3.

In some embodiments, in response to detecting occurrence of a swapped key error involving an intended key that was not selected and a neighboring key that was accidentally selected, a "missed selection" vector between the current activation region for the intended key and the touch location of the neighboring key is computed. Alternatively, the missed selection vector can be computed between the intended soft key and the touch location of the neighboring key. The missed selection vector represents the distance that the selection of the neighboring soft key missed selection of the intended key and in what direction the selection was missed. Thus, the missed selection vector has a distance component and a direction component.

For example, referring again to UI 400K (FIG. 4K), in response to detecting the first occurrence of the swapped key error involving intended soft key 's' and the neighboring soft key 'a', a first missed selection vector may be computed between the current activation region 422-1 (or the 's' soft key) and touch location 421-1. Similarly, in response to detecting the second occurrence of the swapped key error, a second missed selection vector may be computed between the current activation region 422-1 (or the 's' soft key) and touch location 421-2. Similarly, in response to detecting the third occurrence of the swapped key error, a third missed selection vector may be computed between the current activation region 422-1 (or the 's' soft key) and touch location 421-3. A missed selection vector for a touch location and an activation region may be computed based on the centroid of the activation region or some other point within or on the activation region. Similarly, a missed selection vector for a touch location and a soft key may be computed based on the centroid of the soft key or some other point within or on the soft key.

In some embodiments, in response to detecting occurrence of a swapped key error, the activation region of the intended key is enlarged based on missed selection vectors computed for a plurality of previous occurrences of the swapped key error (including the latest/current occurrence of the swapped key error). The direction and magnitude of the enlargement may be based on a summary missed selection vector computed based on the missed selection vectors. For example, the summary missed selection vector may be an arithmetic mean, average, or other mathematical combination of the plurality of missed selection vectors.

UI 400L (FIG. 4L) shows an example enlargement of the activation region 422-1 of UI 400K (FIG. 4K) based on a summary selection vector computed based on three missed selection vectors computed for the first, second, and third occurrences of the swapped key error involving the 'a' soft key and the 's' soft key discussed above. The enlarged activation region 422-2 is in the general direction of the 'a' soft key with a slight bias in the northwest direction that reflects the touch locations 421-1, 421-2, and 421-3 (UI 400K) for the three occurrences of the swapped key error. Further, the enlarged activation region 422-2 is enlarged sufficiently to cover the centroids of the three touch locations 421-1, 421-2, and 421-3. With the enlarged activation region 422-2 for the 's' soft key, future selections of the 's' soft key can now occur at touch locations 421-1, 421-2, and 421-3 (UI 400K). Further, because the enlarged activation region 422-2 is biased in the direction of the previous swapped key errors involving the neighboring 'a' soft key, as opposed to being enlarged in all directions, the enlarged activation region 422-2 reduces the probability of causing new typographical errors involving other neighboring soft keys (e.g., the 'd' soft key). UI 400L also shows how the activation region 423-1 of the 'a' soft key could be reduced to avoid overlap with the enlarged activation region 422-2 of the 's' soft key.

Although the above example illustrates how recorded touch locations can be used to enlarge an activation region of an intended key involved in a swapped key error, recorded touch locations can be similarly used to enlarge an activation region of a soft key involved in a reversed key error, a concurrent neighboring key error, or any other type of typographical error involving neighboring soft keys.

Swapped Key Error

In some embodiments, a swapped key error is detected when the user replaces an unintended soft key selection with selection of a neighboring soft key. For example, a swapped key error may be detected when the selection "pleade" is replaced with "please" ('d' is replaced neighboring 's'). The replacement of the unintended soft key can be made manually (e.g., by deleting soft key selections and inserting new soft key selections that replace the deleted soft key selections) or by accepting a suggested replacement word (e.g., indirectly or directly accepting "please" to replace "pleade").

Response to Swapped Key Error

In some embodiments, in response to a swapped key error involving an intended soft key that was not selected and an unintended neighboring soft key that was selected, the activation region of the intended soft key is enlarged in the direction of the neighboring soft key and the activation region of the neighboring soft key is reduced or contracted thereby making it easier to select the intended soft key with a touch gesture (e.g., a tap select gestures or smudge select gesture) and harder to select the neighboring soft key with the touch gesture and thus decreasing the probability that the neighboring soft key is unintentionally swapped for the intended soft key in the future.

In some embodiments, the response to a swapped key error involving an intended soft key that was not selected and an unintended neighboring soft key that was selected is taken only after a predetermined number (e.g., 10) of occurrences of the swapped key error are detected.

Reversed Key Error

In some embodiments, a reversed key error is detected when the user replaces a selection of a first soft key followed by a selection of a second soft key with selection of the second soft key followed by selection of the first soft key. For example, a swapped key error may be detected when the selection "plaese" is replaced with "please" ('ae' is replaced with 'ea'). The replacement can be made manually (e.g., by deleting soft key selections and inserting new soft key selections that replace the deleted soft key selections) or by accepting a suggested replacement word (e.g., indirectly or directly accepting "plaese" to replace "please").

Response to Reversed Key Error

In some embodiments, in response to a reversed key error in which selection of a first soft key immediately followed by selection of a second soft key is replaced with selection of the second soft key immediately followed by selection of the first soft key, the activation sensitivity of the second soft key is increased by decreasing the temporal offset of the second soft key, if the temporal offset of the second soft key is greater than zero (or other minimum temporal offset value), thereby making it easier to select the second soft key in the future. Additionally or alternatively, the activation sensitivity of the first soft key is decreased by increasing the temporal offset of the first soft key thereby making it harder to select the first soft key in the future.

In some embodiments in which the first and second soft keys are neighboring soft keys, the activation region of the second soft key is enlarged in the direction of the first soft key and the activation region of the first soft key is reduced or contracted thereby making it easier in the future to select the second soft key with a touch gesture (e.g., a tap select gestures or smudge select gesture) and harder in the future to accidentally select the first soft key with the touch gesture.

Concurrent Neighboring Key Error

In some embodiments, a concurrent neighboring key error is detected when the user concurrently selects two neighboring soft keys and then replaces the two selections with selection of only one of the two selected soft keys (e.g., deletes the second selection and retains the first selection or deletes both the first and second selections and re-selects the second selection). To detect this type of error, a clock time for each of the two soft key selections may be recorded in a memory of the device. Instead of a clock time, a time delta representing the amount of time between the two soft key selections may be recorded. For purposes of determining whether a concurrent neighboring key error has occurred, if the difference between the clock times of the two soft key selections or the time delta is less than a predetermined threshold (e.g., half a second), then the selections of the two neighboring soft keys may be considered concurrent. The replacement can be made manually (e.g., by deleting soft key selections and inserting new soft key selections that replace the deleted soft key selections) or by accepting a suggested replacement word (e.g., indirectly or directly accepting "please" to replace "pleaser").

Response to Concurrent Neighboring Key Error

In some embodiments, in response to a concurrent neighboring key error involving two neighboring soft keys in which one of the two neighboring soft keys was an intended selection and the other of the two neighboring soft keys was an unintended selection, the activation region of the intended soft key is enlarged in the direction of the unintended soft key and the activation region of the unintended soft key is reduced or contracted thereby making it easier in the future to select the intended soft key with a touch gesture (e.g., a tap select gestures or smudge select gesture) and harder in the future to select the unintended soft key with the touch gesture.

In some embodiments, in addition to or instead of enlarging the activation region of the intended soft key and reducing the activation region of the unintended soft key, the activation sensitivity of the unintended soft key is decreased by increasing the temporal offset of the unintended soft key thereby making it harder in the future to select the unintended soft key. Additionally, if the temporal offset of the intended soft key is greater than zero (or other minimum temporal offset value), then the activation sensitivity of the intended soft key can be increased by reducing the temporal offset of the intended key to make the intended soft key easier to select in the future.

While specific examples of typographical errors and responses thereto are provided herein, it should be understood that the invention is not limited to the specific examples. More generally, when a typographical error involving one or more soft keys is detected or a number of occurrences of the typographical error is detected, the activation regions of the involved soft keys may be expanded or contracted and/or the temporal offsets of the involved soft keys may be increased or decreased with the aim of preventing future occurrences of the typographical errors.

Keyboard Profiles

In some embodiments, a plurality of keyboard profiles is maintained for a single soft keyboard. At a given time, the soft keyboard is associated with one of the plurality of keyboard profiles. The keyboard profile that the soft keyboard is currently associated with is referred to herein as the "active" keyboard profile. Each keyboard profile of the plurality of keyboard profiles may be stored in a memory of the device.

Each of the plurality of keyboard profiles includes key activation information for one or more soft keys of the soft keyboard. The key activation information may include, but is not limited to, information such as:

Information specifying the current activation regions the soft keys;
Information specifying current temporal offsets of the soft keys;
Information specifying the number of times soft keys have been involved in typographical errors including which soft keys have been involved in which type of typographical errors; and
Missed selection vector information.

By changing which keyboard profile is active based on the context, the same soft key can have a different activation region and/or temporal offset in different input-affecting contexts. Such input-affecting contexts include, but are not limited to, the identity and/or characteristics of the particular user that is using the device. For example, one user may have relatively large fingers that cause the user to make more typographical errors relative to another user with smaller fingers. As another example, a user may be elderly or disabled. Each of these different users can have different keyboard profiles. As a user makes typographical errors, the errors may be recorded against that user's keyboard profile. Further, responses to typographical errors (e.g. enlargement and/or reduction of activation regions, increases and/or decreases to temporal offsets, etc.) are made relative to the current settings of the activation regions and the temporal offsets in that user's keyboard profile. After a response is taken, the current settings in the user's keyboard profile are updated to reflect the enlargements/reductions to activation regions and/or increases/decreases to temporal offsets. The result of using user-specific keyboard profiles is that soft keys of a given soft keyboard can have different activation regions and different temporal offsets for different users.

In some embodiments, the operating system of the device is configured with a default keyboard profile for a soft keyboard that specifies default activation regions and default temporal offsets for soft keys of the soft keyboard. When a user authenticates or otherwise logs on to the operating system, the operating system loads the user's keyboard profile for the soft keyboard. Any activation region and any temporal offset settings for soft keys of the soft keyboard in the user's keyboard profile override the default settings for those soft keys when the user is using the soft keyboard to select the soft keys.

In some embodiments, a user's keyboard profile has one or more sub-keyboard profiles that each correspond to one or more additional input-affecting factors. Such additional input-affecting factors may include, but are not limited to, the physical orientation of the device (e.g., as detected by the accelerometer 168 of device 100), lighting conditions in which the device is being used (e.g., as detected by the optical sensor 164 of device 100), a time of day (e.g., a determined from a device clock), or whether the computing device is moving (e.g., as detected by GPS Module 133 of device 100). When an additional input-affecting context is detected by the device, the user's corresponding sub-keyboard profile may be activated. As the user makes typographical errors in the input-affecting context, the errors may be recorded against the user's active sub-keyboard profile. Further, responses to typographical errors including enlargement and reduction of activation regions and decreases to temporal offsets are made relative to the current settings of the activation regions and the temporal offsets in the user's active sub-keyboard profile. After a response is taken, the current settings in the user's active sub-keyboard profile are updated to reflect the enlargements/reductions to activation regions and/or increases/decreases to temporal offsets. The result of using user-specific sub-keyboard profiles is that soft keys of a given soft keyboard can have different activation regions and different temporal offsets in different input-affecting contexts. Once the input-affecting context is no longer detected (e.g., the device has stopped moving), the device may revert to the user's "base" keyboard profile.

Exemplary Methods for Preventing Typographical Errors on Soft Keyboards

FIGS. 5A-5D are flow diagrams illustrating methods 501, 511, 521, and 531 for preventing typographical errors on soft keyboards. The methods are performing at a computing device (e.g., device 300, FIG. 3, or portable computing device 100, FIG. 1) with a touch-screen display and the touch-sensitive surface is on the display. Some operations in the methods may be combined and/or the order of some operations may be changed.

The methods increase the effectiveness, efficiency, and user satisfaction with computing devices that obtain text input by soft keyboard selections by preventing typographical errors on such soft keyboards. Such methods may complement or replace existing methods for preventing typographical errors on soft keyboards. For battery-operated computing devices, preventing typographical errors on soft keyboards conserves power and increases the time between battery charges because power that would otherwise be needed for error-correction operations is not consumed.

Preventing Typographical Errors: Wrong Key Selected

Figure 5A:
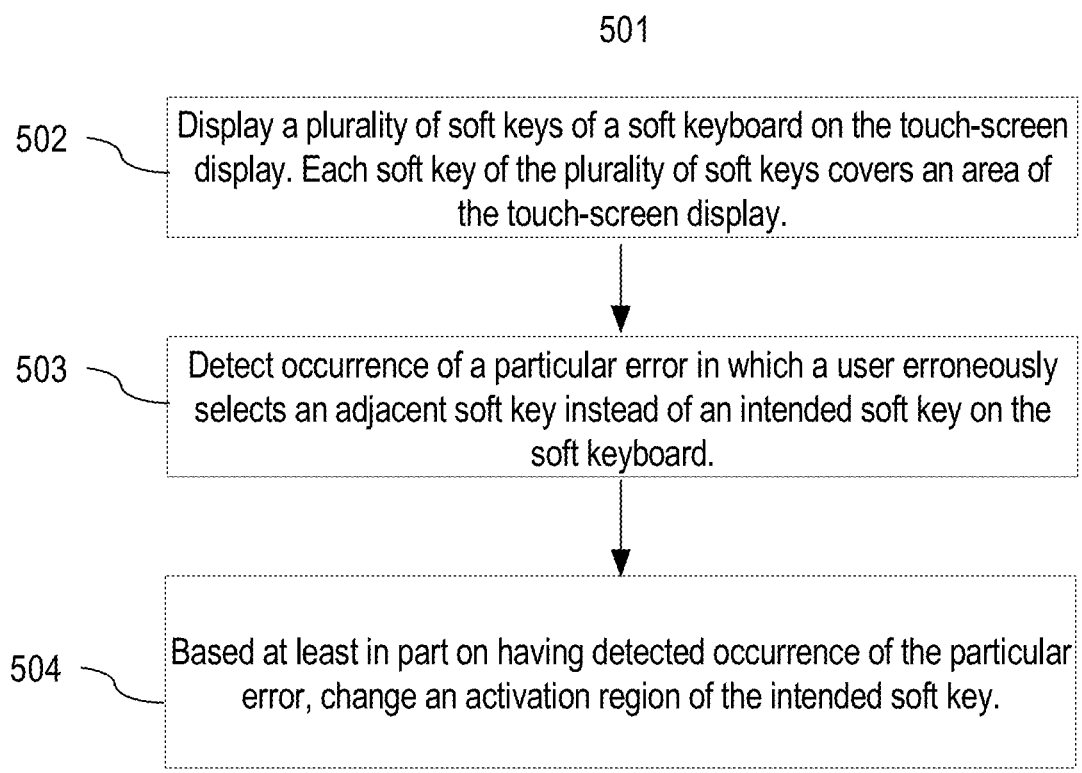

Referring to FIG. 5A, it illustrates a first method 501 for preventing typographical errors on soft keyboards. The device displays (502) a plurality of soft keys of a soft keyboard on a touch-screen display. Each soft key of the plurality of soft keys covers an area of the touch-screen display. For example, referring to FIG. 4A, soft keys 406-11 (for the Latin small letter 'a') and 406-12 (for the Latin small letter 's') of soft keyboard 402 are displayed on touch-screen display 112. Each of soft keys 406-11 and 406-12 cover an area of the touch-screen display bordered by the periphery of the key.

The device detects (503) occurrence of a particular typographical error in which a user of the device erroneously selects an adjacent soft key instead of an intended soft key on the soft keyboard. For example, referring against to FIG. 4A, the particular error may be a swapped key error in which the user erroneously selects soft key 406-11 instead intended soft key 406-12.

In some embodiments, detecting (503) occurrence of the particular error includes detecting when, after the user selects the adjacent soft key, the user replaces selection of the adjacent soft key with selection of the intended soft key. For example, referring again to FIG. 4A, for a swapped key error in which the user erroneously selects soft key 406-11 instead intended soft key 406-12, the swapped key error may be detected when the user deletes the selection of soft key 406-11 (e.g., with selection of a backspace or delete key) and replaces the selection of soft key 406-11 with selection of soft key 406-12.

In some embodiments, detecting (503) occurrence of the particular error includes detecting when the user accepts a suggested word that replaces the second symbol with the first symbol. For example, a swapped key error may be detected when the user accepts suggested replace word "ask" with "aak". Note that this acceptance may also be detected as a duplicate key error.

The device, based at least in part on having detected (503) occurrence of the particular error, changes (504) an activation region of the intended soft key. In some embodiments, changing the activation region includes one or more of: increasing (enlarging) how much of the touch-screen display is covered by the activation region, changing the peripheral shape of the activation region, or sifting position of the activation region relative to the touch-screen display.

Enlargement of the activation region may cause to activation region to extend beyond the area covered by the intended soft key. For example, referring again to FIG. 4A, after detecting a swapped key error involving adjacent soft key 406-11 and intended soft key 406-12, the device may change the activation region of soft key 406-12 to cover a larger area of the touch-screen display 112 than the area of the display 112 covered by soft key 406-12. In other embodiments, the area covered by the intended soft key can be extended to cover the new, larger activation region of the soft key.

In some embodiments, changing (504) the activation region of the intended soft key includes enlarging the activation region of the intended soft key along an axis of the activation region in a direction of the adjacent soft key. For example, referring again to FIG. 4A, after detecting a swapped key error involving adjacent soft key 406-11 and intended soft key 406-12, the device may change the activation region of soft key 406-12 along an axis of the activation region of soft key 406-12 in the direction of adjacent soft key 406-11.

In some embodiments, changing (504) the activation region of the intended soft key includes enlarging the activation region equally in at least two different directions. For example, referring again to FIG. 4A, after detecting a swapped key error involving adjacent soft key 406-11 and intended soft key 406-12, the device may change the activation region of soft key 406-12 by enlarging it in all of a north, south, east, and west direction.

In some embodiments, the activation region of the intended soft key is changed (504) only after detecting a predefined number of occurrences of the particular error. For example, referring again to FIG. 4A, the activation region of soft key 406-12 may be changed in response to detecting (503) the swapped key error only after detecting a predefined number of occurrences N of the swapped key error where the occurrence detected at step 503 is the Nth occurrence of the swapped key error.

In some embodiments, changing (504) the activation region of the intended soft key is based on a determined distance between the activation region of the intended soft key prior to the change (504) (or the intended soft key itself) and a touch location pertaining to selection of the adjacent soft key. For example, referring again to FIG. 4A, after detecting a swapped key error involving adjacent soft key 406-11 and intended soft key 406-12, a missed selection vector between the adjacent soft key 406-11 and the intended soft key 406-12 (or the activation region thereof) may be computed and the change (504) to the activation region of the intended soft key 406-12 may be based on the computed missed selection vector.

In some embodiments, after changing (504) the activation region of the intended soft key, at least a portion of the activation region of the intended soft key overlaps the adjacent soft key on the touch-screen display. For example, referring again to FIG. 4A, after detecting a swapped key error involving adjacent soft key 406-11 and intended soft key 406-12, the activation region of soft key 406-12 may be enlarged so that at least a portion of the activation region of soft key 406-12 overlaps the adjacent soft key 406-11 on the touch-screen display 112.

In some embodiments, the activation region of the intended soft key is changed (504) by modifying a keyboard profile, of a plurality of keyboard profiles, used by the computing device. For example, referring again to FIG. 4A, after detecting a swapped key error involving adjacent soft key 406-11 and intended soft key 406-12, the user's keyboard profile or a sub-keyboard profile thereof may be modified with new activation region settings for soft key 406-12 and soft key 406-11.

In some embodiments, the device has a predetermined break-in period during which a user initially uses the soft keyboard. During the break-in period, the number of detected occurrences of a typographical error that are required to occur before the device responds to the error may be relatively small. In this way, activation regions of soft keys are quickly adapted as the user is first learning how to use the soft keyboard. After the break-in period has expired, the number of detected occurrences of the typographical error that are required to occur before the device responds to the error is automatically increased by which time the user is expected to have become accustomed to using the soft keyboard and appropriate adjustments to activation regions and temporal offsets have been made. The break-in period may be keyboard profile specific and may start for a given keyboard profile when the given keyboard profile is first activated for the user. The length of the break-in period can be based on any number of factors include a predetermined number of soft key selections and/or a predetermined length of time.

In some embodiments, the number of detected occurrences of a typographical error that are required to occur before the device responds to the error is user configurable. For example, the device may allow the user to select one of several sensitivity levels. For higher sensitivity levels, a greater number of detected occurrences of a typographical error are required to occur before the device responds to the error. For lower sensitivity levels, a lesser number of detected occurrences of a typographical error are required to occur before the device responds to the error. There may be one user-configurable sensitivity level that applies to all types of typographical errors or a user-configurable sensitivity level for each type of typographical error. Further, sensitivity levels may be keyboard profile specific.

Preventing Typographical Errors: Two Keys Selected

Figure 5B:
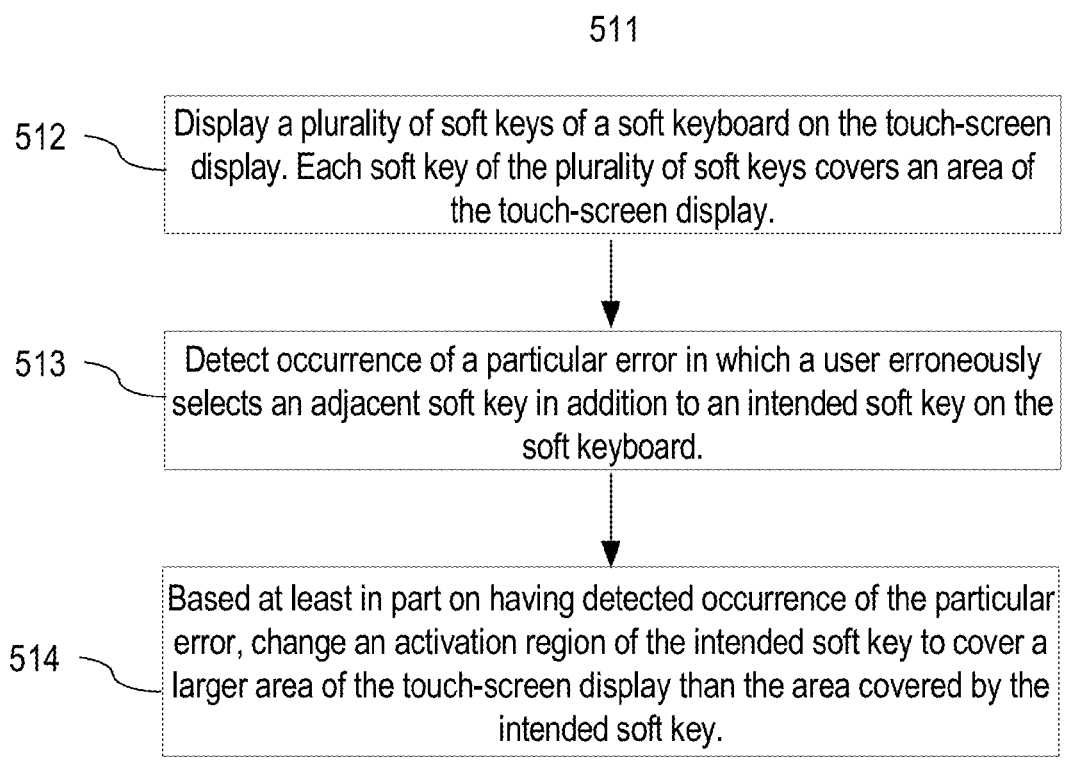

Referring now to FIG. 5B, it illustrates a second method 511 for preventing typographical errors on soft keyboards. The device displays (512) a plurality of soft keys of a soft keyboard on a touch-screen display. Each soft key of the plurality of soft keys covers an area of the touch-screen display. For example, referring to FIG. 4A, soft keys 406-11 (for the Latin small letter 'a') and 406-12 (for the Latin small letter 's') of soft keyboard 402 are displayed on touch-screen display 112. Each of soft keys 406-11 and 406-12 cover an area of the touch-screen display bordered by the periphery of the key.

The device detects (513) occurrence of a particular typographical error in which a user of the device erroneously selects an adjacent soft key in addition to an intended soft key on the soft keyboard. For example, referring against to FIG. 4A, the particular error may be a concurrent neighboring key error in which the user erroneously selects soft key 406-11 in addition to intended soft key 406-12.

The device, based at least in part on having detected (513) occurrence of the particular error, changes (504) an activation region of the intended soft key to cover a larger area of the touch-screen display than the area covered by the intended soft key. For example, referring again to FIG. 4A, after detecting a concurrent neighboring key error involving adjacent soft key 406-11 and intended soft key 406-12, the device may change the activation region of soft key 406-12 to cover a larger area of the touch-screen display 112 than the area of the display 112 covered by soft key 406-12.

In some embodiments, detecting (513) occurrence of the particular error includes detecting that the erroneous selection of the adjacent soft key and the selection of the intended soft key are concurrent selections. Such detection may be based on a clock time difference between a time when the adjacent soft key is selected and a time when the intended soft key is selected. The clock time difference may be compared to a predetermined threshold. If the clock time difference is below the threshold, the selections of the adjacent and intended keys may be considered concurrent.

Preventing Typographical Errors: Reversed Key Error

Figure 5C:
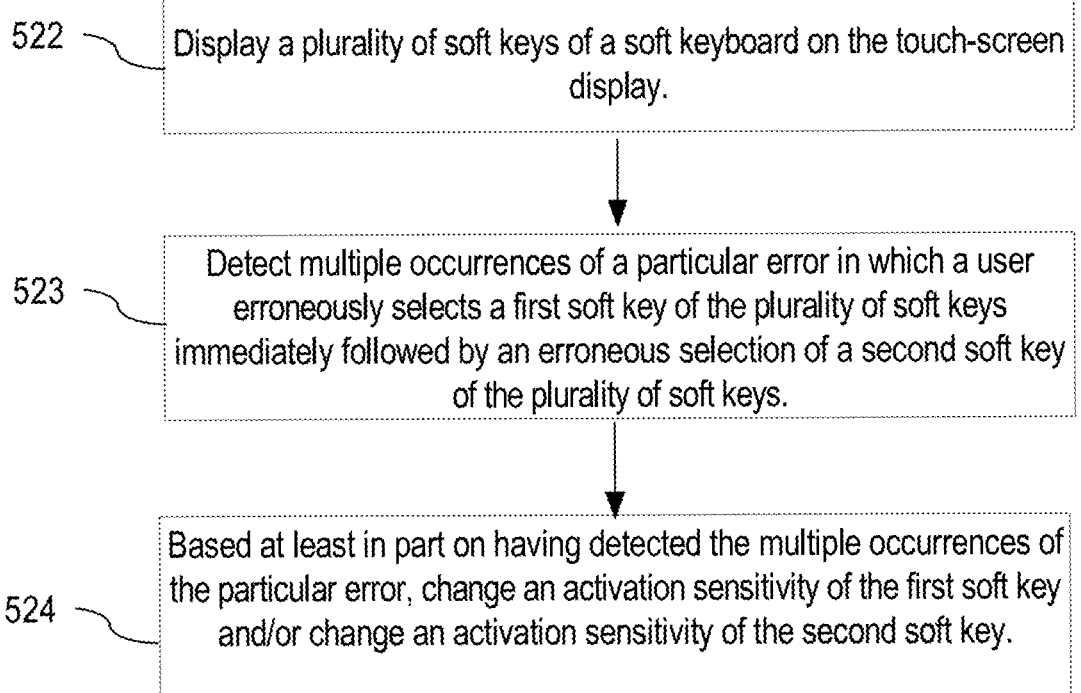

Referring now to FIG. 5C, it illustrates a third method 521 for preventing typographical errors on soft keyboards. The device displays (522) a plurality of soft keys of a soft keyboard on a touch-screen display. For example, referring to FIG. 4A, soft keys 406-11 (for the Latin small letter 'a') and 406-12 (for the Latin small letter 's') of soft keyboard 402 are displayed on touch-screen display 112.

The device detects (523) multiple occurrences of a particular error in which a user erroneously selects a first soft key of the plurality of soft keys immediately followed by an erroneous selection of a second soft key of the plurality of soft keys. For example, referring again to FIG. 4A, the device 100 may detect two or more occurrences of a reversed key error in which the user intended to select soft key 406-12 immediately followed by a selection of soft key 406-11 but instead accidentally selected soft key 406-11 immediately followed by a selection of soft key 406-12. In the current context, "immediately following" means immediately following in a sequence of soft key selections. The two selections may or may not be concurrent or immediately following in time.

The device, based at least in part on having detected (523) the multiple occurrences of the particular error, changes (524) the activation sensitivity of the first soft key and/or changes (524) the activation sensitivity of the second soft key. For example, referring again to FIG. 4A, in response to detecting two or more occurrences of a reversed key error in which the user intended to select soft key 406-12 immediately followed by a selection of soft key 406-11 but instead accidentally selected soft key 406-11 immediately followed by a selection of soft key 406-12, the device may decrease the activation sensitivity of soft key 406-11 and increase the activation sensitivity of soft key 406-12.

Preventing Typographical Errors Using Condition-Specific Profiles

Referring now to FIG. 5D, it illustrates a fourth method 531 for preventing typographical errors on soft keyboards. The device displays (532) a plurality of soft keys of a soft keyboard on a touch-screen display. For example, referring to FIG. 4A, soft keys 406-11 (for the Latin small letter 'a') and 406-12 (for the Latin small letter 's') of soft keyboard 402 are displayed on touch-screen display 112.

The device detects (533) one or more factors that may affect how the user of the device selects soft keys. The input-affecting factors may include, but are not limited to, the identity of the user of the device, a physical orientation of the computing device, lighting conditions in which the computing device is being used, a time of day, or whether the computing device is moving. The identity of the user of the device may be detected based on authentication credentials provided by the user input to the device. For example, the identity of the user of the device may be detected based on a valid username and password provided by the user when logging on to the device or authenticating with an operating system of the device. The current physical orientation of the device may be distinct from the orientation of the display screen. For example, the display screen can be in either landscape or portrait orientation while the physical orientation of the device is predominately vertically orientated. Similarly, the display screen can be in either landscape or portrait orientation while the physical orientation is predominately horizontally oriented. The physical orientation of the device may be detected based on an accelerometer of the device (e.g., accelerometer 168 of device 100 of FIGS. 1 and 2). Lighting conditions in which the device is being used may be detected based on an optical sensor (e.g., optical sensors 164 of device 100 of FIGS. 1 and 2). The time of day may be detected based on an operating system clock or a device clock. Whether the device is moving may be detected based on a GPS receiver and associated module (e.g., GPS Module 133 of device 100 of FIGS. 1 and 2).

The device, in response to detecting (533) the one or more input-affecting factors, automatically selects a keyboard profile of a plurality of keyboard profiles based on the one or more detected input-affecting factors. The selected keyboard profile is used to determine which soft keys of the soft keyboard have been selected. In particular, the selected keyboard profile stores the current activation regions and temporal offsets for soft keys of the soft keyboard while the selected keyboard profile remains active. The selected keyboard profile remains active so long as the same input-affecting factors continue to be detected. For example, a first keyboard profile selected based on the identity of the user may be active after the user logs on to the device. Afterwards, when it is detected that the device is in motion, a second keyboard profile is activated. Later, after detecting that the device has stopped moving, the device may revert to the first keyboard profile. If more than one keyboard profile is applicable at a given time, then the multiple keyboard profiles may be activated according to a keyboard profile priority in which higher priority activated keyboard profiles override lower priority activated keyboard profiles. The override may be on a soft key by soft key basis such that if key activation information for a given soft key is not present in the highest priority activated keyboard profile then the highest priority keyboard profile for which key activation information for the given soft key is available is used. The priority of keyboard profiles can be predetermined and/or configured by the user.

Exemplary Computing Devices

Techniques described herein for preventing typographical errors on soft keyboards may be embodied in a computing device. In some embodiments, the computing device is a portable computing device such as a tablet computer or smart phone device that may also contain other functions, such as PDA and/or music player functions. Exemplary embodiments of portable computing devices include, without limitation, the iPhone® and iPad® devices from Apple, Inc. of Cupertino, Calif. In some embodiments, the computing device is a stationary computing device such as a desktop computer or workstation computer.

In the above description of embodiments, a computing device that includes a display and a touch-sensitive surface through which user input is provided is described. It should be understood, however, that the computing device may include one or more other physical user interface devices, such as a physical keyboard, a mouse and/or a joystick through which user input is provided in addition to or instead of user input provided through a touch-sensitive surface.

In some embodiments, the device supports one or more software programs that implement, use, or benefit from the techniques described herein for preventing typographical errors on soft keyboards. These software programs may include, but are not limited to, an operating system, a device driver, a word processing application, a web browsing application, a spreadsheet application, an instant messaging application, and/or an e-mail application.

The various applications that may be executed on the device may use at least one common physical user interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Attention is now directed towards an embodiment of a portable computing device with a touch-sensitive display. FIG. 1 is a block diagram illustrating a portable computing device 100 with a touch-sensitive display 112 in accordance with some embodiments. The touch-sensitive display 112 is sometimes called a "touch screen" for convenience, and may also be known as or called a touch-sensitive display system. The device 100 may include a memory 102 (which may include one or more non-transitory computer readable mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable computing device 100, and that the device 100 may have more or fewer components than shown, may combine two or more components, or a may have a different configuration or arrangement of the components. The various components shown in FIG. 1 may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user interface objects.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112. In an exemplary embodiment, projected mutual capacitance sensing technology is used, such as that found in the iPhone® and iPad® from Apple Computer, Inc. of Cupertino, Calif.

A touch-sensitive display in some embodiments of the touch screen 112 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, a touch screen 112 displays visual output from the portable device 100, whereas touch sensitive tablets do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (e.g., icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively.

For a virtual click wheel, the click wheel may be either an opaque or semitransparent object that appears and disappears on the touch screen display in response to user interaction with the device. In some embodiments, a virtual click wheel is displayed on the touch screen of a portable computing device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIG. 1 shows an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module software component (also called a camera module) stored in the memory 102, the optical sensor 164 may capture still images or video. In some embodiments, an optical sensor is located on the back of the device 100, opposite the touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIG. 1 shows a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables the touch screen 112 when the computing device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

The device 100 may also include one or more accelerometers 168. FIG. 1 shows an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 127, an accessibility module 128, a contact/motion module (or set of instructions) 129, a graphics module (or set of instructions) 130, an attachment editing module 131, a text input module (or set of instructions) 132, a Global Positioning System (GPS) module (or set of instructions) 133, and applications (or sets of instructions) 134.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 127 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on some iPad® devices.

In conjunction with audio circuitry 110, speaker 111, touch screen 112, display controller 156, contact module 129, graphics module 130, and text input module 132, the accessibility module 128 facilitates touch-based navigation among user interface elements so that a user may navigate, select, activate, and otherwise interact with elements in the user interface without necessarily seeing the user interface. In some embodiments, the accessibility module 128 facilitates selecting and activating user interface elements within the user interface without directly selecting or contacting those user interface elements. Exemplary user interface elements include, without limitation, user interface icons and widgets, application icons, application interfaces, menus, web browsers, web pages and applications from the world-wide web, application controls, documents, soft/virtual keyboards and numeric pads, calculators, calendars, lists, tables, emails, HTML text, XML text, rich text, unformatted text, maps, game interfaces, etc. User interface elements include any aspect of a graphical or textual user interface that a user may interact with or manipulate when using an electronic device the user interface is running on.

The contact/motion module 129 may detect contact with the touch screen 112 (in conjunction with the display controller 156) and other touch sensitive devices (e.g., a touchpad or physical click wheel). The contact/motion module 129 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). The contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 129 and the display controller 156 detects contact on a touchpad. In some embodiments, the contact/motion module 129 and the controller 160 detects contact on a click wheel.

The contact/motion module 129 may detect a gesture input by a user. Different gestures on the touch-sensitive surface have different contact patterns. Thus, a gesture may be detected by detecting a particular contact pattern. For example, detecting a finger tap gesture comprises detecting a finger-down event followed by detecting a finger-up event at the same position (or substantially the same position) as the finger-down event (e.g., at the position of an icon). As another example, detecting a finger swipe gesture on the touch-sensitive surface comprises detecting a finger-down event followed by detecting one or more finger-dragging events, and subsequently followed by detecting a finger-up event.

The graphics module 130 includes various known software components for rendering and displaying graphics on the touch screen 112 or other display, including components for changing the intensity of graphics that are displayed. As used herein, the term "graphics" includes any object that can be displayed to a user, including without limitation text, web pages, icons (such as user interface objects including soft keys), digital images, videos, animations and the like.

In some embodiments, the graphics module 130 stores data representing graphics to be used. Each graphic may be assigned a corresponding code. The graphics module 130 receives, from applications etc., one or more codes specifying graphics to be displayed along with, if necessary, coordinate data and other graphic property data, and then generates screen image data to output to display controller 156.

The text input module 132, which may be a component of graphics module 130, provides soft keyboards for entering text in various software applications stored in memory 102 (e.g., contacts, e-mail, IM, browser, and any other application that needs text input).

The GPS module 133 determines the location of the device and provides this information for use in various software applications stored in memory 102 (e.g., to telephone application for use in location-based dialing, to camera application as picture/video metadata, and to applications that provide location-based services such as weather widgets, local yellow page widgets, and map/navigation widgets).

The applications 134 may include the following modules (or sets of instructions), or a subset or superset thereof:
  an e-mail client module;
  a web browser module;
  a word processing module;
  a spreadsheet module; and
  a text messaging module.

Examples of other applications 134 that may be stored in memory 102 include other word processing applications, other image editing applications, drawing applications, presentation applications, JAVA-enabled applications, encryption, digital rights management, voice recognition, and voice replication.

Each of the above identified modules and applications may correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, a video player module may be combined with a music player module into a single module). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

FIG. 2 illustrates a portable computing device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 134 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

FIG. 3 is a block diagram of an exemplary computing device with a display and a touch-sensitive surface in accordance with some embodiments. Device 300 need not be portable. In some embodiments, the device 300 is a laptop computer, a desktop computer, a tablet computer, a multimedia player device, a navigation device, an educational device (such as a child's learning toy), a gaming system, or a control device (e.g., a home or industrial controller). The device 300 typically includes one or more processing units (CPU's) 310, one or more network or other communications interfaces 370, memory 380, and one or more communication buses 320 for interconnecting these components. The communication buses 320 may include circuitry (sometimes called a chipset) that interconnects and controls communications between system components. The device 300 includes an input/output (I/O) interface 330 comprising a display 340, which in some embodiments is a touch screen display 112. The I/O interface 330 also may include a keyboard and/or mouse (or other pointing device) 350 and a touchpad 360. Memory 380 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 380 may optionally include one or more storage devices remotely located from the CPU(s) 310. In some embodiments, memory 380 stores programs, modules, and data structures analogous to the programs, modules, and data structures stored in the memory 102 of portable computing device 100 (FIG. 1), or a subset thereof. Furthermore, memory 380 may store additional programs, modules, and data structures not present in the memory 102 of portable computing device 100. For example, memory 380 of device 300 may store a drawing module, a presentation module, a word processing module, a website creation module, a disk authoring module, a spreadsheet module and/or attachment an editing module, while memory 102 of portable computing device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 380 may store a subset of the modules and data structures identified above. Furthermore, memory 370 may store additional modules and data structures not described above.

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:
1. A computer-implemented method, comprising:
at a computing device with a touch-screen display:
displaying a plurality of soft keys of a soft keyboard on the touch-screen display, each soft key of the plurality of soft keys covering an area of the touch-screen display and having a respective activation region;
while a first input-affecting context is detected, detecting occurrence of a first set of one or more errors in which a user erroneously selects an adjacent soft key instead of an intended soft key on the soft keyboard;
while a second input-affecting context is detected, detecting occurrence of a second set of one or more errors in which the user erroneously selects an adjacent soft key instead of an intended soft key on the soft keyboard;
after detecting occurrence of the first set of one or more errors and the second set of one or more errors, preparing to receive input via the soft keyboard, wherein preparing to receive input via the soft keyboard includes:
determining whether an input-affecting context is detected;
in accordance with a determination that the first input-affecting context is detected, changing the respective activation regions of one or more soft keys of the soft keyboard based at least in part on the first set of errors that were detected while the first input-affecting context was detected, and at least one of:
decreasing activation sensitivity of the respective activation regions of one or more soft keys by increasing a temporal offset associated with the one or more soft keys based at least in part on the first set of errors that were detected while the first input-affecting context was detected, or
increasing activation sensitivity of the respective activation regions of one or more soft keys by decreasing a temporal offset associated with the one or more soft keys based at least in part on the first set of errors that were detected while the first input-affecting context was detected; and
in accordance with a determination that the second input-affecting context is detected, changing the respective activation regions of one or more soft keys of the soft keyboard based at least in part on the second set of errors that were detected while the second input-affecting context was detected, and at least one of:
decreasing activation sensitivity of the respective activation regions of one or more soft keys by increasing a temporal offset associated with the one or more soft keys based at least in part on the second set of errors that were detected while the second input-affecting context was detected, or
increasing activation sensitivity of the respective activation regions of one or more soft keys by decreasing a temporal offset associated with the one or more soft keys based at least in part on the second set of errors that were detected while the second input-affecting context was detected; and
wherein changing the respective activation region for a soft key in the one or more soft keys of the soft keyboard includes performing at least one of:
increasing how much of the touch-screen display is covered by the respective activation region,
changing a peripheral shape of the respective activation region, or
shifting position of the respective activation region relative to the touch-screen display.

2. The method of claim 1 wherein changing the respective activation region for the soft key in the one or more soft keys of the soft keyboard includes increasing how much of the touch-screen display covered by the activation region.

3. The method of claim 1 wherein changing the respective activation region for the soft key in the one or more soft keys of the soft keyboard includes changing the peripheral shape of the activation region.

4. The method of claim 1 wherein changing the respective activation region for the soft key in the one or more soft keys of the soft keyboard includes shifting position of the activation region relative to the touch-screen display.

5. The method of claim 1 wherein changing the respective activation region for the soft key in the one or more soft keys of the soft keyboard includes causing the respective activation region to extend beyond the area covered by the intended soft key.

6. The method of claim 1, wherein changing the respective activation region for the soft key in the one or more soft keys of the soft keyboard includes enlarging the respective activation region of the soft key along an axis of the activation region in a direction of an adjacent soft key for which an error was detected under the detected input affecting factor.

7. The method of claim 1, wherein changing the respective activation region for the soft key in the one or more soft keys of the soft keyboard includes enlarging the respective activation region equally in at least two different directions.

8. The method of claim 1, wherein changing the respective activation region for a soft key in the one or more soft keys of the soft keyboard includes performing changing an activation region of a second soft key adjacent to the soft key to cover a smaller area of the touch-screen display than the area covered by the second soft key on the touch-screen display.

9. The method of claim 1, wherein:
the intended soft key is mapped to a first symbol;
the adjacent soft key is mapped to a second symbol; and
detecting occurrence of an error includes detecting when, after the user selects the adjacent soft key to cause the second symbol to be displayed, the user replaces the second symbol with the first symbol.

10. The method of claim 1, wherein:
the intended soft key is mapped to a first symbol;
the adjacent soft key is mapped to a second symbol; and
detecting occurrence of an error includes detecting when the user accepts a suggested word that replaces the second symbol with the first symbol.

11. The method of claim 1, wherein changing the respective activation region for a soft key in the one or more soft keys of the soft keyboard is performed after detecting a predefined number of occurrences of an error associated with the soft key.

12. The method of claim 11, wherein the method further comprises:
after a predefined period of time has lapsed, automatically increasing the number of occurrences of the error associated with the soft key that are required to occur before changing the respective activation region of the soft key.

13. The method of claim 11, wherein the method further comprises:
allowing the user to specify one of a plurality of sensitivity levels; and
wherein the predefined number of occurrences of the error associated with the soft key that must occur before changing the respective activation region of the soft key is based, at least in part, on the sensitivity level selected by the user.

14. The method of claim 1, wherein the erroneous selection of the adjacent soft key by the user is associated with a touch location based on location data pertaining to touch input on the touch-screen display, the changing of the respective activation region for the soft key in the one or more soft keys of the soft keyboard further comprising:
determining, for one or more erroneous selections of adjacent soft keys to the soft key, a distance parameter relating to the touch location and location of the soft key; and
changing the respective activation region of the soft key based, at least in part, on the distance parameter.

15. The method of claim 1, wherein, after changing the respective activation region of the soft key in the one or more soft keys of the soft keyboard, at least a portion of the respective activation region of the soft key overlaps an adjacent soft key on the touch-screen display.

16. The method of claim 1, wherein in accordance with a determination that the first input-affecting context is detected, changing the respective activation regions of the one or more soft keys is performed for a first keyboard profile activated while the first input-affecting context is detected, and wherein in accordance with a determination that the second input-affecting context is detected, changing the respective activation regions of the one or more soft keys is performed for a second keyboard profile activated while the second input-affecting context is detected.

17. The method of claim 1, wherein a detected input-affecting context comprises from one or more of:
lighting conditions in which the computing device is being used,
a time of day, or
movement of the computing device.

18. A computer-implemented method, comprising:
at a computing device with a touch-screen display:
displaying a plurality of soft keys of a soft keyboard on the touch-screen display, each soft key of the plurality of soft keys covering an area of the touch-screen display and having a respective activation region;
while a first input-affecting context is detected, detecting occurrence of a first set of one or more errors in which a user erroneously selects an adjacent soft key in addition to an intended soft key on the soft keyboard;
while a second input-affecting context is detected, detecting occurrence of a second set of one or more errors in which the user erroneously selects an adjacent soft key in addition to an intended soft key on the soft keyboard;
after detecting occurrence of the first set of one or more errors and the second set of one or more errors, preparing to receive input via the soft keyboard, wherein preparing to receive input via the soft keyboard includes:
determining whether an input-affecting context is detected;
in accordance with a determination that the first input-affecting context is detected, changing the respective activation regions of one or more soft keys of the soft keyboard based at least in part on the first set of errors that were detected while the first input-affecting context was detected, and at least one of:
decreasing activation sensitivity of the respective activation regions of one or more soft keys by increasing a temporal offset associated with the one or more soft keys based at least in part on the first set of errors that were detected while the first input-affecting context was detected, or
increasing activation sensitivity of the respective activation regions of one or more soft keys by decreasing a temporal offset associated with the one or more soft keys based at least in part on the first set of errors that were detected while the first input-affecting context was detected; and in accordance with a determination that the second input-affecting context is detected, changing the respective activation regions of one or more soft keys of the soft keyboard based at least in part on the second set of errors that were detected while the second input-affecting context was detected, and at least one of:

decreasing activation sensitivity of the respective activation regions of one or more soft keys by increasing a temporal offset associated with the one or more soft keys based at least in part on the second set of errors that were detected while the second input-affecting context was detected, or increasing activation sensitivity of the respective activation regions of one or more soft keys by decreasing a temporal offset associated with the one or more soft keys based at least in part on the second set of errors that were detected while the second input-affecting context was detected; and wherein changing the respective activation region for a soft key in the one or more soft keys of the soft keyboard includes performing at least one of:

increasing how much of the touch-screen display is covered by the respective activation region, changing a peripheral shape of the respective activation region, or shifting position of the respective activation region relative to the touch-screen display.

19. The method of claim 18, wherein detecting occurrence of an error in the first set and second set of errors includes detecting that the erroneous selection of the adjacent soft key and the selection of the intended soft key are substantially concurrent selections.

20. The method of claim 18, wherein a detected input-affecting context comprises from one or more of:

lighting conditions in which the computing device is being used, a time of day, or movement of the computing device.

21. A computer-implemented method, comprising:

at a computing device with a touch-screen display:

displaying a plurality of soft keys of a soft keyboard on the touch-screen display, each soft key of the plurality of soft keys covering an area of the touch-screen display and having a respective activation region with an activation sensitivity;

while a first input-affecting context is detected, detecting occurrence of a first set of one or more errors in which a user erroneously selects a first soft key of the plurality of soft keys immediately followed by an erroneous selection of a second soft key of the plurality of soft keys based on the user indicating an intended selection of the second soft key followed by an intended selection of the first soft key;

while a second input-affecting context is detected, detecting occurrence of a second set of one or more errors in which a user erroneously selects a third soft key of the plurality of soft keys immediately followed by an erroneous selection of a fourth soft key of the plurality of soft keys based on the user indicating an intended selection of the fourth soft key followed by an intended selection of the third soft key;

after detecting occurrence of the first set of one or more errors and the second set of one or more errors, preparing to receive input via the soft keyboard, wherein preparing to receive input via the soft keyboard includes:

determining whether an input-affecting context is detected;

in accordance with a determination that the first input-affecting context is detected, changing the activation sensitivity of the respective activation region of at least one of the first soft key and the second soft key based at least in part on the first set of errors that were detected while the first input-affecting context was detected; and in accordance with a determination that the second input-affecting context is detected, changing the activation sensitivity of the respective activation region of at least one of the third soft key and the fourth soft key based at least in part on the second set of errors that were detected while the second input-affecting context was detected;

wherein changing the activation sensitivity of the respective activation region for a soft key in the one or more soft keys of the soft keyboard includes performing at least one of:

decreasing activation sensitivity of the respective activation region of the soft key by increasing a temporal offset associated with the soft key; or increasing activation sensitivity of the respective activation region of the soft key by decreasing a temporal offset associated with the soft key.

22. The method of claim 21, wherein changing the activation sensitivity for the respective activation region of the first soft key is based, at least in part, on having detected multiple occurrences of the user erroneously selecting the first soft key immediately followed by the erroneous selection of the second soft key in the first set of errors.

23. The method of claim 22, wherein changing the activation sensitivity for the respective activation region of the first soft key includes increasing an amount of time after which a selection of the first soft key is initiated that the first soft key can be selected by increasing a temporal offset associated with the first soft key.

24. The method of claim 23, wherein changing the activation sensitivity for the respective activation region of the second soft key is based at least in part on having detected multiple occurrences of the user erroneously selecting the first soft key immediately followed by the erroneous selection of the second soft key in the first set of errors.

25. The method of claim 24, wherein changing the activation sensitivity for the respective activation region of the second soft key includes increasing an amount of time after which a selection of the second soft key is initiated that the second soft key can be selected by increasing a temporal offset associated with the second soft key.

26. The method of claim 21, wherein a detected input-affecting context comprises from one or more of:

lighting conditions in which the computing device is being used, a time of day, or movement of the computing device.

27. One or more non-transitory computer-readable storage media storing one or more programs, the one or more programs comprising instructions which, when executed by a computing device with a touch-screen display, cause the device to:

display a plurality of soft keys of a soft keyboard on the touch-screen display, each soft key of the plurality of soft keys covering an area of the touch-screen display and having a respective activation region;

while a first input-affecting context is detected, detect occurrence of a first set of one or more errors in which a user erroneously selects an adjacent soft key instead of an intended soft key on the soft keyboard;

while a second input-affecting context is detected, detect occurrence of a second set of one or more errors in which the user erroneously selects an adjacent soft key instead of an intended soft key on the soft keyboard;

after detecting occurrence of the first set of one or more errors and the second set of one or more errors, prepare to receive input via the soft keyboard, wherein preparing to receive input via the soft keyboard includes:

determining whether an input-affecting context is detected;

in accordance with a determination that the first input-affecting context is detected, changing the respective activation regions of one or more soft keys of the soft keyboard based at least in part on the first set of errors that were detected while the first input-affecting context was detected, and at least one of:

decreasing activation sensitivity of the respective activation regions of one or more soft keys by increasing a temporal offset associated with the one or more soft keys based at least in part on the first set of errors that were detected while the first input-affecting context was detected, or increasing activation sensitivity of the respective activation regions of one or more soft keys by decreasing a temporal offset associated with the one or more soft keys based at least in part on the first set of errors that were detected while the first input-affecting context was detected; and in accordance with a determination that the second input-affecting context is detected, changing the respective activation regions of one or more soft keys of the soft keyboard based at least in part on the second set of errors that were detected while the second input-affecting context was detected, and at least one of:

decreasing activation sensitivity of the respective activation regions of one or more soft keys by increasing a temporal offset associated with the one or more soft keys based at least in part on the second set of errors that were detected while the second input-affecting context was detected, or increasing activation sensitivity of the respective activation regions of one or more soft keys by decreasing a temporal offset associated with the one or more soft keys based at least in part on the second set of errors that were detected while the second input-affecting context was detected; and wherein changing the respective activation region for a soft key in the one or more soft keys of the soft keyboard includes performing at least one of:

increasing how much of the touch-screen display is covered by the respective activation region, changing a peripheral shape of the respective activation region, or shifting position of the respective activation region relative to the touch-screen display.

28. The non-transitory computer-readable storage media of claim 27, wherein:

the intended soft key is mapped to a first symbol;

the adjacent soft key is mapped to a second symbol; and detecting occurrence of an error includes detecting when, after the user selects the adjacent soft key to cause the second symbol to be displayed, the user replaces the second symbol with the first symbol.

29. The non-transitory computer-readable storage media of claim 27, wherein:

the intended soft key is mapped to a first symbol;

the adjacent soft key is mapped to a second symbol; and detecting occurrence of an error includes detecting when the user accepts a suggested word that replaces the second symbol with the first symbol.

30. One or more non-transitory computer-readable storage media storing one or more programs, the one or more programs comprising instructions which, when executed by a computing device with a touch-screen display, cause the device to:

display a plurality of soft keys of a soft keyboard on the touch-screen display, each soft key of the plurality of soft keys covering an area of the touch-screen display and having a respective activation region;

while a first input-affecting context is detected, detect occurrence of a first set of one or more errors in which a user erroneously selects an adjacent soft key in addition to an intended soft key on the soft keyboard;

while a second input-affecting context is detected, detect occurrence of a second set of one or more errors in which the user erroneously selects an adjacent soft key in addition to an intended soft key on the soft keyboard;

after detecting occurrence of the first set of one or more errors and the second set of one or more errors, prepare to receive input via the soft keyboard, wherein preparing to receive input via the soft keyboard includes:

determining whether an input-affecting context is detected;

in accordance with a determination that the first input-affecting context is detected, changing the respective activation regions of one or more soft keys of the soft keyboard based at least in part on the first set of errors that were detected while the first input-affecting context was detected, and at least one of:

decreasing activation sensitivity of the respective activation regions of one or more soft keys by increasing a temporal offset associated with the one or more soft keys based at least in part on the first set of errors that were detected while the first input-affecting context was detected, or increasing activation sensitivity of the respective activation regions of one or more soft keys by decreasing a temporal offset associated with the one or more soft keys based at least in part on the first set of errors that were detected while the first input-affecting context was detected; and in accordance with a determination that the second input-affecting context is detected, changing the respective activation regions of one or more soft keys of the soft keyboard based at least in part on the second set of errors that were detected while the second input-affecting context was detected, and at least one of:

decreasing activation sensitivity of the respective activation regions of one or more soft keys by increasing a temporal offset associated with the one or more soft keys based at least in part on the second set of errors that were detected while the second input-affecting context was detected, or increasing activation sensitivity of the respective activation regions of one or more soft keys by decreasing a temporal offset associated with the one or more soft keys based at least in part on the second set of errors that were detected while the second input-affecting context was detected; and wherein changing the respective activation region for a soft key in the one or more soft keys of the soft keyboard includes performing at least one of:
increasing how much of the touch-screen display is covered by the respective activation region,
changing a peripheral shape of the respective activation region, or
shifting position of the respective activation region relative to the touch-screen display.

31. One or more non-transitory computer-readable storage media storing one or more programs, the one or more programs comprising instructions which, when executed by a computing device with a touch-screen display, cause the device to:
display a plurality of soft keys of a soft keyboard on the touch-screen display, each soft key of the plurality of soft keys covering an area of the touch-screen display and having a respective activation region with an activation sensitivity;
while a first input-affecting context is detected, detect occurrence of a first set of one or more errors in which a user erroneously selects a first soft key of the plurality of soft keys immediately followed by an erroneous selection of a second soft key of the plurality of soft keys based on the user indicating an intended selection of the second soft key followed by an intended selection of the first soft key;
while a second input-affecting context is detected, detect occurrence of a second set of one or more errors in which a user erroneously selects a third soft key of the plurality of soft keys immediately followed by an erroneous selection of a fourth soft key of the plurality of soft keys based on the user indicating an intended selection of the fourth soft key followed by an intended selection of the third soft key;
after detecting occurrence of the first set of one or more errors and the second set of one or more errors, prepare to receive input via the soft keyboard, wherein preparing to receive input via the soft keyboard includes:
determining whether an input-affecting context is detected;
in accordance with a determination that the first input-affecting context is detected, changing the activation sensitivity of the respective activation region of at least one of the first soft key and the second soft key based at least in part on the first set of errors that were detected while the first input-affecting context was detected; and
in accordance with a determination that the second input-affecting context is detected, changing the activation sensitivity of the respective activation region of at least one of the third soft key and the fourth soft key based at least in part on the second set of errors that were detected while the second input-affecting context was detected;
wherein changing the activation sensitivity of the respective activation region for a soft key in the one or more soft keys of the soft keyboard includes performing at least one of:
decreasing activation sensitivity of the respective activation region of the soft key by increasing a temporal offset associated with the soft key; or
increasing activation sensitivity of the respective activation region of the soft key by decreasing a temporal offset associated with the soft key.

32. The non-transitory computer-readable storage media of claim 31, wherein changing the activation sensitivity for the respective activation region of the first soft key is based, at least in part, on having detected multiple occurrences of the user erroneously selecting the first soft key immediately followed by the erroneous selection of the second soft key in the first set of errors, and wherein changing the activation sensitivity for the respective activation region of the first soft key includes increasing an amount of time after which a selection of the first soft key is initiated that the first soft key can be selected by increasing a temporal offset associated with the first soft key.

33. The non-transitory computer-readable storage media of claim 31, wherein changing the activation sensitivity for the respective activation region of the second soft key is based, at least in part, on having detected multiple occurrences of the user erroneously selecting the first soft key immediately followed by the erroneous selection of the second soft key in the first set of errors, and wherein changing the activation sensitivity for the respective activation region of the second soft key includes increasing an amount of time after which a selection of the second soft key is initiated that the second soft key can be selected by increasing a temporal offset associated with the second soft key.

* * * * *